(12) United States Patent
Senzaki et al.

(10) Patent No.: US 9,430,816 B2
(45) Date of Patent: Aug. 30, 2016

(54) IMAGE PROCESSING METHOD, IMAGE PROCESSING SYSTEM, IMAGE PROCESSING DEVICE, AND IMAGE PROCESSING PROGRAM CAPABLE OF REMOVING NOISES OVER DIFFERENT FREQUENCY BANDS, RESPECTIVELY

(71) Applicant: NEC Corporation, Tokyo (JP)

(72) Inventors: Kenta Senzaki, Tokyo (JP); Masato Tsukada, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 14/397,202

(22) PCT Filed: Apr. 25, 2013

(86) PCT No.: PCT/JP2013/062202
§ 371 (c)(1),
(2) Date: Oct. 27, 2014

(87) PCT Pub. No.: WO2013/161940
PCT Pub. Date: Oct. 31, 2013

(65) Prior Publication Data
US 2015/0086126 A1    Mar. 26, 2015

(30) Foreign Application Priority Data

Apr. 27, 2012    (JP) .............................. 2012-102019

(51) Int. Cl.
*G06K 9/40*    (2006.01)
*H04N 5/00*    (2011.01)
(Continued)

(52) U.S. Cl.
CPC ............. *G06T 5/002* (2013.01); *G06T 7/0085* (2013.01); *G06T 2207/20016* (2013.01); *G06T 2207/20024* (2013.01); *G06T 2207/20182* (2013.01); *G06T 2207/20192* (2013.01)

(58) Field of Classification Search
None
See application file for complete search history.

(56) References Cited

U.S. PATENT DOCUMENTS

| 6,754,398 B1 | 6/2004 | Yamada |
| 2010/0027885 A1 | 2/2010 | Aragaki et al. |
| 2010/0067572 A1* | 3/2010 | Mori ..................... H04N 19/61 375/240.01 |

(Continued)

FOREIGN PATENT DOCUMENTS

| JP | 2001-167261 | 6/2001 |
| JP | 2010-033453 | 2/2010 |

(Continued)

OTHER PUBLICATIONS

Leonid I. Rudin et al., "Nonlinear total variation based noise removal algorithms", Physica D vol. 60, 1992, pp. 259-268.

(Continued)

*Primary Examiner* — Randolph I Chu
(74) *Attorney, Agent, or Firm* — Young & Thompson

(57) ABSTRACT

Disclosed is an image processing method including: generating an initial denoised image with a reduced noise while preserving an edge in an input image; controlling an iterative operation performed based on energy defined in advance based on an initial residual component calculated from the input image and the initial denoised image; and separating the initial denoised image to a skeleton component and a residual component by the controlled iterative operation to generate the skeleton component as an output image.

15 Claims, 23 Drawing Sheets

(51) Int. Cl.
*G06T 5/00* (2006.01)
*G06T 7/00* (2006.01)

(56) References Cited

U.S. PATENT DOCUMENTS

| | | | | |
|---|---|---|---|---|
| 2010/0226577 | A1* | 9/2010 | Saito | G06T 11/001 382/195 |
| 2011/0228971 | A1* | 9/2011 | Webb | H04N 1/32235 382/100 |
| 2012/0057798 | A1* | 3/2012 | Saito | H04N 5/00 382/218 |

FOREIGN PATENT DOCUMENTS

| | | |
|---|---|---|
| JP | 2010-166598 | 7/2010 |
| JP | 2011-043901 | 3/2011 |

OTHER PUBLICATIONS

International Search Report PCT/JP2013/062202 dated Jun. 11, 2013.

Haruya Aizawa et al., "Removal of Signal-Dependent Noise through the TV-L1 Nonlinear Image Decomposition", The Transactions of the Institute of Electronics, Information and Communication Engineers, Aug. 1, 2008, vol. J91-D, No. 8, pp. 1998 to 2001.

* cited by examiner

FIG. 3
(a)
(b)

(Prior Art)

(Prior Art)

IMAGE PROCESSING METHOD, IMAGE PROCESSING SYSTEM, IMAGE PROCESSING DEVICE, AND IMAGE PROCESSING PROGRAM CAPABLE OF REMOVING NOISES OVER DIFFERENT FREQUENCY BANDS, RESPECTIVELY

TECHNICAL FIELD

The present invention relates to an image processing method, an image processing system, an image processing device, and an image processing program.

BACKGROUND ART

In the image processing technology, a technology for reducing noise contained in an image is essential to sharp reproduction of a captured image. A typical technology for reducing noise is disclosed, for example, in Non-patent Literature 1. The Non-patent Literature 1 discloses a noise removal method using total-variation (T-V) norm regularization. Hereinafter, the method is referred to as a T-V method for short.

FIG. 19 illustrates an image processing method using the conventional T-V method.

FIG. 20 is a flow chart illustrating the image processing method using the conventional T-V method.

An input image F is supplied to a skeleton component/residual component separation unit 101.

The skeleton component/residual component separation unit 101 separates the supplied image F to a skeleton component $U_{T\text{-}V}$ composed of a strong edge and a flat area and a residual component $V_{T\text{-}V}$ composed of a texture and a noise. In other words, the input image F is represented according to the following formula (1), i.e., is represented by a sum of the skeleton component $U_{T\text{-}V}$ and the residual component $V_{T\text{-}V}$.

$$F = U_{T\text{-}V} + V_{T\text{-}V} \qquad (1)$$

The skeleton component $U_{T\text{-}V}$ can be obtained by minimizing a total variation norm $J(U_{T\text{-}V})$ of the $U_{T\text{-}V}$ that is represented by the following formula (2).

$$J(U_{T\text{-}V}) = \int |\nabla U_{T\text{-}V}| dx dy \qquad (2)$$

Meanwhile, in the formula, x represents a pixel location of the skeleton component $U_{T\text{-}V}$ in a horizontal direction, and y represents a pixel location of the skeleton component $U_{T\text{-}V}$ in a vertical direction.

The minimization problem can be solved by iteration of the Chambolle's projection method. Alternatively, a subgradient method using a subgradient of a T-V norm can be used instead of the Chambolle's projection method.

Where k represents an iteration count, $$U_{T\text{-}V}^{(k)}$$

represents a skeleton component at a time of a $k^{th}$ iteration, and β represents a value to be set based on a standard deviation of a noise of a target image, $$U_{T\text{-}V}^{(0)} = F$$

is set as an initial value where k=0 (step S1).

As represented by the following formula (3), a skeleton component at a time of a $k+1^{th}$ iteration, i.e., $$U_{T\text{-}V}^{(k+1)}$$

is calculated using the subgradient method (step S2).

$$U_{T\text{-}V}^{(k+1)} = U_{T\text{-}V}^{(k)} - \alpha^{(k)} g(U_{T\text{-}V}^{(k)}), \qquad (3)$$

where $U_{T\text{-}V}^{(0)} = F$, $$\alpha^{(k)} = \frac{\beta}{k+1}, \text{ and}$$

$$g(X) = \frac{dJ(X)}{dX}$$

A stop condition for stopping the iteration will be described below. Where a height of the input image is M, a width thereof is N, and a m-line n-row element of the residual component at the time of the $k^{th}$ iteration, i.e., $$V_{T\text{-}V}^{(k)}$$

it is possible to stop the iteration (step S3), using a standard deviation $\sigma_{noise}$ of a noise of the target image estimated in advance, when the following formula is satisfied.

$$\frac{1}{MN} \sum_{1 \leq m \leq M, 1 \leq n \leq N} (v_{m,n}^{(k)})^2 \approx \sigma_{noise}^2 \qquad (4)$$

Here, the formula (4) is true provided that the residual component, i.e., $$V_{T\text{-}V}^{(k)}$$

is the noise. Alternatively, it is possible to stop the iteration (step S3) when $$\sum_{1 \leq m \leq M, 1 \leq n \leq N} |v_{m,n}^{(k+1)} - v_{m,n}^{(k)}| < \varepsilon \qquad (5)$$

is satisfied using a threshold ε. In other words, in the above formula (5), a result of the $k^{th}$ iteration, i.e., $$V_{T\text{-}V}^{(k)}$$

is compared with the $k+1^{th}$ iteration, i.e., $$V_{T\text{-}V}^{(k+1)}$$

and, if a fluctuation amount is sufficiently small, it is considered that a solution is converged.

Further, the iteration is stopped at a time also when the iteration count k reaches the maximum value, i.e., iteration count $k_{max}$ (step S4). Where the iteration count takes a value less than k, and $$U_{T\text{-}V}^{(k)}$$

is not converged, the subgradient method continues provided k=k+1 (step S5).

In thus obtained skeleton component $U_{T\text{-}V}$ and residual component $V_{T\text{-}V}$, the skeleton component $U_{T\text{-}V}$ is output as a denoised image Z according to the following formula (6) (step S6).

$$Z = U_{T\text{-}V} \qquad (6)$$

FIG. 21 illustrates an improved image processing method of the image processing method using the T-V method of FIG. 19. That is, in the improved method, a noise component of the residual component that was separated by the skeleton component/residual component separation unit 101 is attenuated to be synthesized with the skeleton component.

FIG. 22 is a flow chart illustrating the image processing method of FIG. 21.

The residual component $V_{T-V}$ separated by the skeleton component/residual component separation unit 101 is supplied to a noise suppression unit 102, where the residual component $V_{T-V}$ is subjected to an effect of a function f for attenuating the noise component according to the following formula (7) (step S7). The skeleton component $U_{T-V}$ is synthesized with the residual component (i.e., texture component) f ($V_{T-V}$), of which noise component being attenuated, to be output as the image Z containing less noise (step S6). Meanwhile, step 1 to step 5 are identical to those of the image processing method using the T-V method of FIG. 19. Therefore, descriptions thereof are omitted here.

$$Z = U_{T-V} + f(V_{T-V}) \tag{7}$$

Examples of the function f include soft evaluation threshold processing illustrated in FIG. 23(*a*), hard evaluation threshold processing illustrated in FIG. 23(*b*), and factor processing illustrated in FIG. 23(*c*). The function f, however, is not limited to those examples. Where an input value is x, an output value is f(x), and a threshold is r in the function f, the soft evaluation threshold processing illustrated in FIG. 23(*a*) is represented by the following formula (8).

$$f_{soft}(x, \tau) = \begin{cases} \text{sign}(x)(|x| - \tau) & \text{if } |x| > \tau \\ 0 & \text{otherwise} \end{cases} \tag{8}$$

Here, a sign function in the formula (8) is a function for outputting a plus/minus sign.

The hard evaluation threshold processing illustrated in FIG. 23(*b*) is represented by the following formula (9).

$$f_{hard}(x, \tau) = \begin{cases} x & \text{if } |x| > \tau \\ 0 & \text{otherwise} \end{cases} \tag{9}$$

Further, when γ is set to a proper coefficient, factor processing illustrated in FIG. 23(*c*) is represented by the following formula (10).

$$f_{factor}(x, \gamma) = \gamma \times x \tag{10}$$

Still further, it is possible to combine the soft evaluation threshold processing or the hard evaluation threshold processing with the factor processing according to a formula (11).

$$f_{factor-soft}(x, \gamma, \tau) = f_{soft}(f_{factor}(x, \gamma), \tau)$$

$$f_{soft-factor}(x, \tau, \gamma) = f_{factor}(f_{soft}(x, \tau), \gamma) \tag{11}$$

In the formula (11), a function is constituted using the soft evaluation threshold processing. However, as a matter of course, it is also possible to constitute an equivalent function using the hard evaluation threshold processing.

CITATION LIST

Non-Patent Literature

[Non-Patent Literature 1]
L. Rudin, S. Osher, E. Fatemi, "Nonlinear Total Variation based noise removal algorithms," Physica D vol. 60, 1992, pp. 259-268.

SUMMARY OF INVENTION

Technical Problem

The technology of Non-patent Literature 1 is directed to iteration-type processing in which the above described Chambolle's projection method is repetitively applied until a solution is converged. Therefore, there is a problem of a high calculation cost.

The T-V method is capable of removing a high frequency noise. The T-V method, however, has such a problem that the method is not suitable to remove a low frequency noise that is generated due to unevenness of a distribution density of noise particles and that disperses in a relatively wide area in comparison with a case of the high frequency noise. The low frequency noise is generated by distribution density unevenness of noise particles in a wide area of, for example, a range between several pixels and several tens of pixels. The T-V norm with respect to the low frequency noise becomes small. Therefore, such area is considered as a flat area (i.e., an area without noise). More specifically, the T-V method is no use for the low frequency noise in principle.

The present invention was made to solve the above described problem. A purpose of the present invention is to provide an image processing method capable of effectively and smoothly removing noises over different frequency bands and an image processing device.

Solution to Problem

The present invention is directed to an image processing method including: generating an initial denoised image with a reduced noise while preserving an edge in an input image; controlling an iterative operation performed based on energy defined in advance based on an initial residual component calculated from the input image and the initial denoised image; and separating the initial denoised image to a skeleton component and a residual component by the controlled iterative operation to generate the skeleton component as an output image.

The present invention is directed to an image processing device including: an initial denoised image generation unit generating an initial denoised image by a noise removal method for storing an edge component in an input image; a skeleton component/residual component separation unit separating the initial denoised image to a skeleton component and a residual component by an iterative operation based on energy defined in advance and generating the skeleton component as an output image; and a control unit controlling the iterative operation based on the initial residual component.

Advantageous Effect of Invention

According to the present invention, it is possible to effectively and smoothly remove noises over different frequency bands.

BRIEF DESCRIPTION OF DRAWINGS

FIG. 3(*a*) is an original image containing noise. FIG. 3(*b*) is an image resulting from an application of noise removal processing to the original image of FIG. 3(*a*) by using Wavelet Shrinkage method.

FIG. 16(*b*) is an image resulting from an application of a wavelet transform to the original image of FIG. 16(*a*). FIG. 16(*c*) is an image resulting from recursive three applications of the wavelet transform to the original image of FIG. 16(*a*).

FIG. 23(*b*) is a graph illustrating an input/output response of hard evaluation threshold processing. FIG. 23(*c*) is a graph illustrating an input/output response of factor processing.

DESCRIPTION OF EMBODIMENTS

First Embodiment

A first embodiment of the present invention will be described below.

Figure 1:
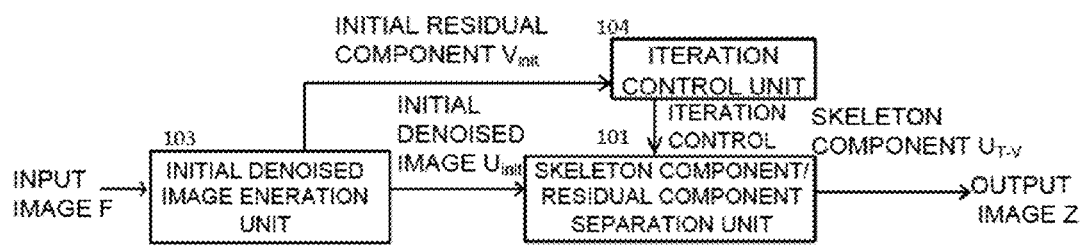
FIG. 1 is an explanatory chart illustrating an image processing method according to a first embodiment.

FIG. 1 is a functional block diagram illustrating an image processing method according to the first embodiment of the present invention.

Figure 19:
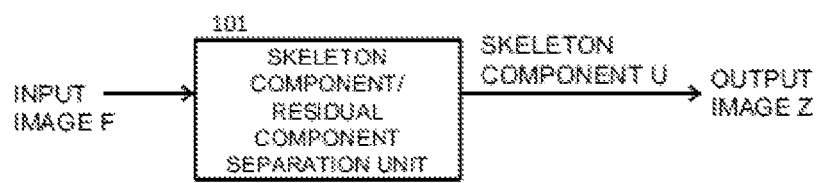
FIG. 19 is an explanatory chart illustrating the conventional image processing method.
Figure 20:
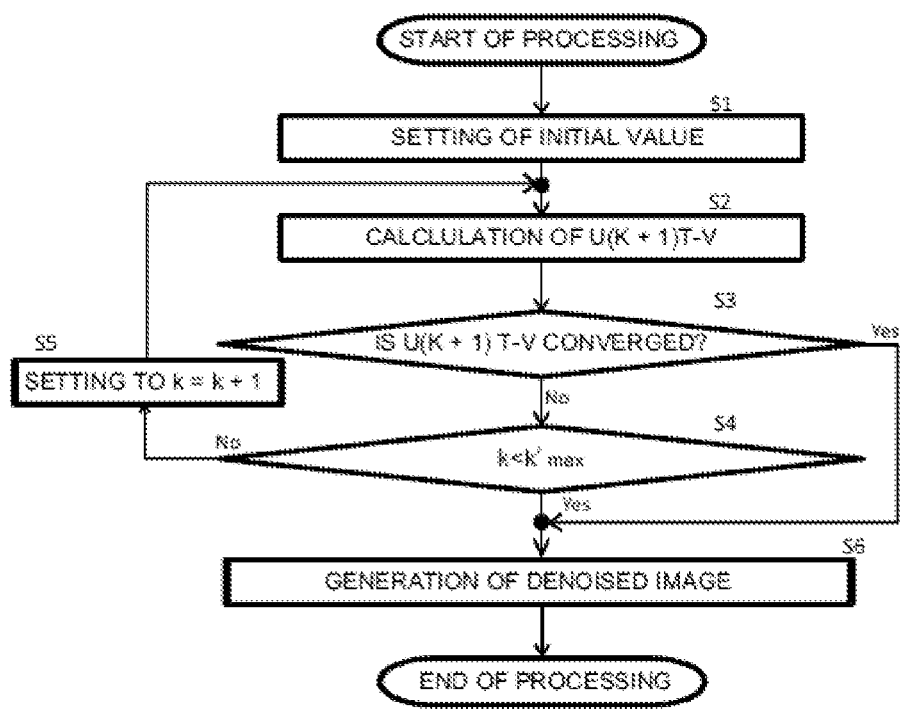
FIG. 20 is a flow chart illustrating exemplary steps of the conventional image processing method.
Figure 21:
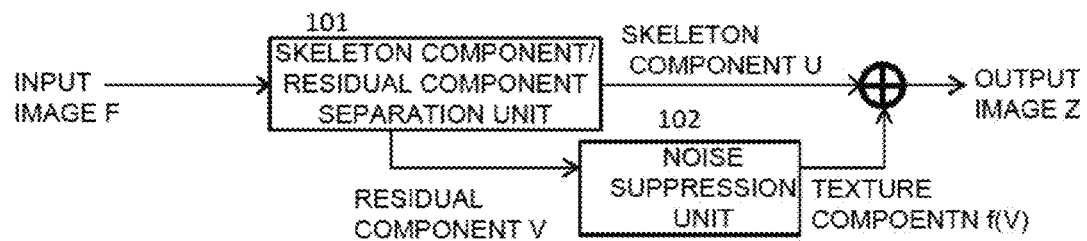
FIG. 21 is a block diagram illustrating another conventional image processing method.
Figure 22:
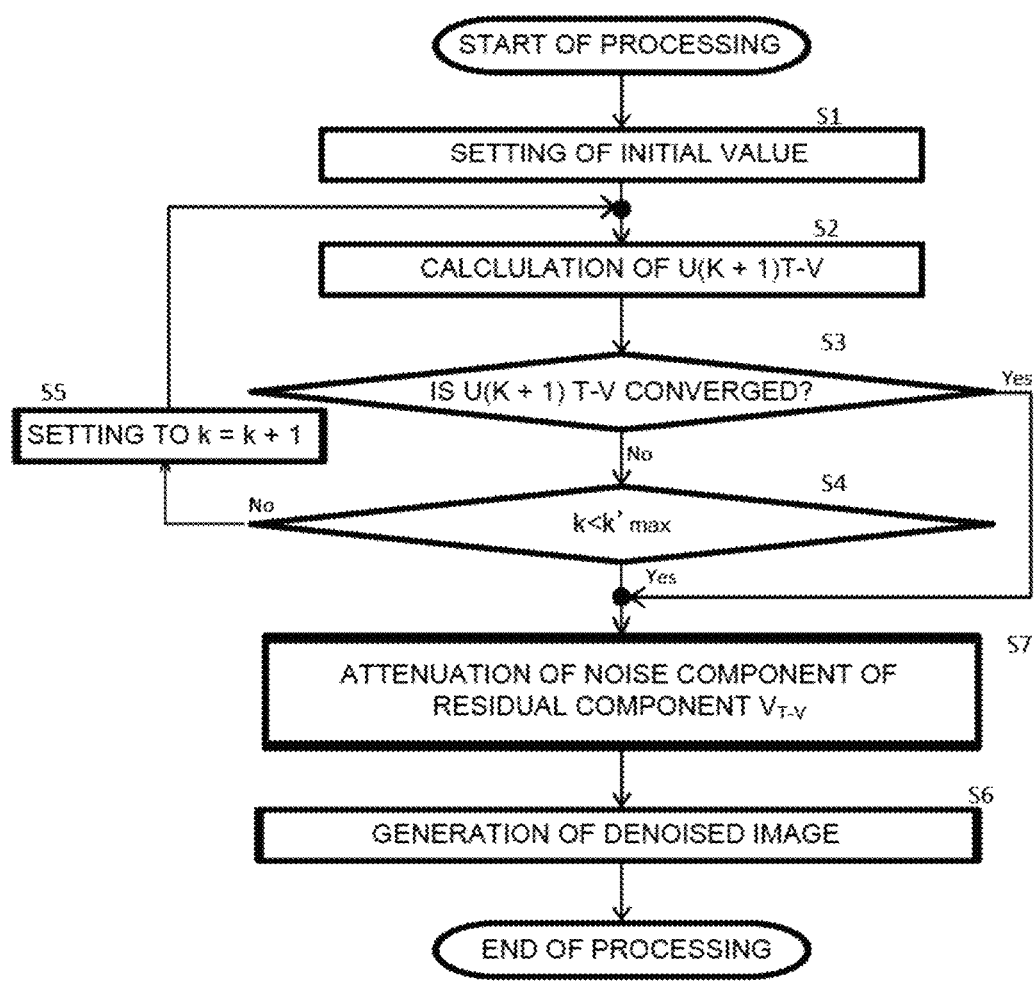
FIG. 22 is a flow chart illustrating exemplary steps of another conventional image processing method.
Figure 23:
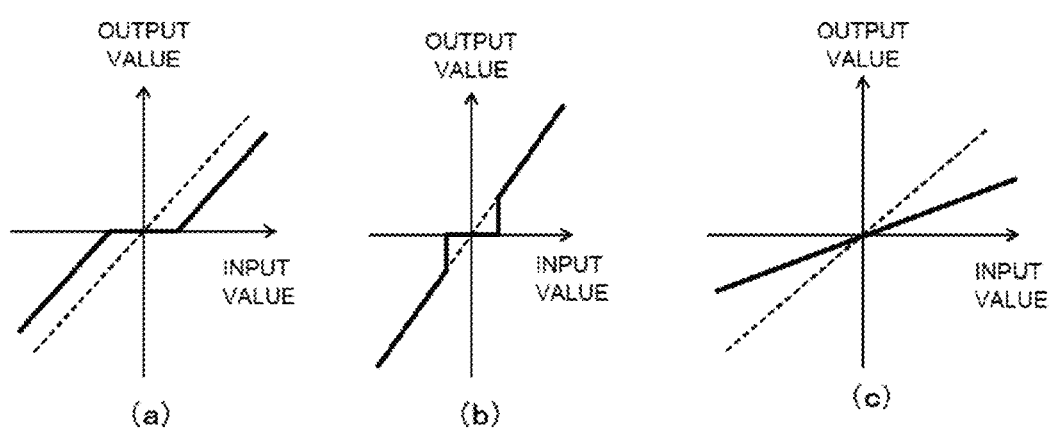
FIG. 23(*a*) is a graph illustrating an input/output response of soft evaluation threshold processing.

The image processing method according to the first embodiment of the present invention is characterized in including an initial denoised image generation unit 103 generating an initial denoised image by a light-weight noise removal method for storing an edge component in an input image, an iteration control unit 104 controlling a skeleton component/residual component separation unit positioned in its downstream based an initial residual component separated from the input image in the initial denoised image generation unit 103, and the skeleton component/residual component separation unit 101 separating the input image to a skeleton component and a residual component as shown in FIG. 19.

Meanwhile, the skeleton component/residual component separation method for separating an image to a skeleton component and a residual component will be described below exemplifying the T-V method described in the above conventional method. However, the skeleton component/residual component separation method is not limited to this.

Figure 2:
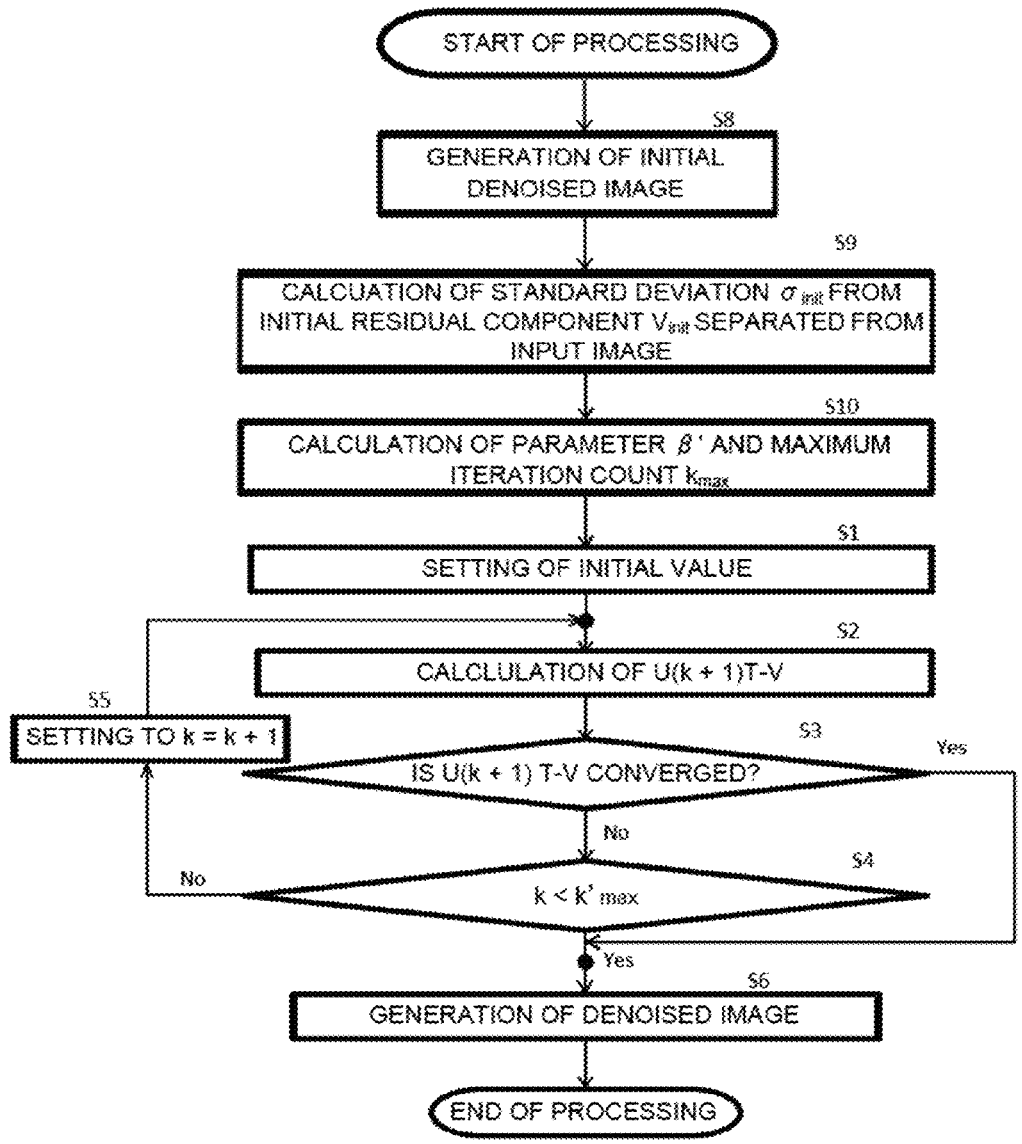
FIG. 2 is a flow chart illustrating exemplary steps of the image processing method according to the first embodiment.

FIG. 2 is a flow chart illustrating the image processing method according to the first embodiment.

Hereinafter, a flow of the processing will be described.

An input image F is supplied to the initial denoised image generation unit 103.

The initial denoised image generation unit 103 applies a light-weight noise removal method for storing the edge component to the input image F, thereby generating an initial denoised image $U_{init}$ (step S8). Where an initial residual component composed of a texture and a noise is noted by $V_{init}$, the following formula (12) is true.

$$F = U_{init} + V_{init} \qquad (12)$$

Thus generated initial denoised image $U_{init}$ is supplied to the skeleton component/residual component separation unit 101. Also, thus separated initial residual component $V_{init}$ is supplied to the iteration control unit 104.

The light-weight noise removal method for storing the edge component in step S8 will be described below. Examples of the light-weight noise removal method include the Wavelet Shrinkage (WS) method and the Bilateral Filter (BF). These methods have high edge preservability and require a calculation cost lower than that of the T-V method.

In the WS method, a two-dimensional wavelet transform is applied to an image, and a high frequency component of a wavelet transform coefficient is attenuated in a zero direction. Then, an inverse two-dimensional wavelet transform is further applied to the image to reconfigure the image, thereby obtaining a noise-reduced image. Where the wavelet transform coefficient is w, a post-Shrinkage wavelet transform coefficient is w', and an attenuation amount is λ, an attenuation processing is represented by, for example, the following formula (13) and formula (14).

$$w' = \begin{cases} \text{sign}(w)(|w| - \lambda) & \text{if } |w| > \lambda \\ 0 & \text{otherwise} \end{cases} \qquad (13)$$

$$w' = \begin{cases} w & \text{if } |w| > \lambda \\ 0 & \text{otherwise} \end{cases} \qquad (14)$$

A sign function in the formula (13) is a function for outputting the plus/minus sign.

In a normal image, almost all the wavelet transform coefficients having small absolute values are noise components. Therefore, setting of the proper attenuation amount λ and attenuation of the wavelet transform coefficient ensure reduction of a noise component contained in the image. Further, since the wavelet transform coefficient having a large absolute value representing the edge component remains, an edge in the input image is finally preserved.

The BF is a weighted smoothing filter-derived filter, which realizes a noise removal method capable of preserving the edge by using the below mentioned two indexes for determining a filter coefficient.

The first index is a spatial distance between a to-be-denoised target pixel and its neighboring pixels. The pixels spatially proximity to the target pixel are deemed to have a high correlation with the target pixel and thus given a large weight factor for the filter coefficient. To the contrary, spatially distant pixels are deemed to have a low correlation with the target pixel and thus given a small weight factor for the filter coefficient.

The second index is a difference between a pixel value of the to-be-denoised target pixel and pixel values of its neighboring pixels. It is deemed that a correlation with the target pixel becomes higher as the difference between pixel values becomes smaller. Therefore, the weight factor of the filter coefficient is set larger. To the contrary, it is deemed that the correlation with the target pixel becomes lower as the difference between pixel values becomes larger. Therefore, the weight factor of the filter coefficient is set smaller.

Specifically, according to an effect of the second index, an area where the pixel values are almost uniform, i.e., a flat area, takes a roll of a typical weighted smoothing filter. This ensures noise removal. To the contrary, according to the effect of the second index, an area where the difference between the pixel values is large, i.e., an area containing the edge, the weight factor of the filter coefficient other than the target pixel is small. This ensures preservation of the edge.

A calculation cost of each of the WS method and the BF is smaller than that of the T-V method. However, a visual artifact may occur in a post-processing image in the WS method. This is exemplified in FIG. 3. FIG. 3(a) is an image containing noise. FIG. 3(b) is an image from which noise was removed by the WS method. In FIG. 3(b), unnatural degradation that does not exist in the original image is seen throughout the image. Further, in principle, it is not possible for the BF to remove isolated noise that is referred to as a pepper noise. However, the WS method and the BF in the present embodiment are only used to generate an initial denoised image. The artifact that occurs in the WS method and the isolated noise that is unremovable by the BF method will be removed by processing performed thereafter in the present invention. Therefore, this is not a problem in the present invention. Further, the conventional WS method requires strict setting of the attenuation amount for reducing the occurrence of the artifact. In the present invention, however, since the artifact that occurs in the WS method can be removed by the processing that will be performed thereafter, it is possible to simplify the setting of the attenuation amount in the WS method.

The iteration control unit 104 controls the iteration count of the T-V method based on the initial residual component $V_{init}$ supplied from the initial denoised image generation unit 103.

A standard deviation $\sigma_{init}$ is calculated based on the initial residual component $V_{init}$ supplied from the initial denoised image generation unit 103 in the following manner (step S9). In step S9, where the m-line n-row element of the initial residual component $V_{init}$ is $$V_{m,n}^{(init)}$$

the standard deviation $\sigma_{init}$ is calculated according to the following formula (15).

$$\sigma_{init} = \sqrt{\frac{1}{MN} \sum_{1 \leq m \leq M, 1 \leq n \leq N} (v_{m,n}^{(init)})^2} \quad (15)$$

In the conventional T-V method, a parameter β in the formula (3) and a maximum iteration count $k_{max}$ of a fixed value are used. In the present embodiment, however, each parameter is corrected based on a standard deviation $\sigma_{noise}$ of noise that was estimated in advance and the standard deviation $\sigma_{init}$ calculated in step S9 (step S10).

For example, a parameter β' represented by the following formula (16) is used, the parameter β' being calculated based on the standard deviation $\sigma_{noise}$ of the noise estimated in advance and the standard deviation $\sigma_{init}$ calculated in step S9.

$$\beta' = \frac{|\sigma_{noise} - \sigma_{init}|}{\sigma_{noise}} \times \beta \quad (16)$$

In other words, in the formula (16), in a case where $\sigma_{init}$ is close to $\sigma_{noise}$, the parameter β' exists close to a converged solution of the T-V method. This ensures improvement of a converging speed. More specifically, narrowing of a to-be-searched area in a single iteration ensures improvement of the converging speed.

Further, a maximum iteration count $k'_{max}$ is determined according to the following formula (17) using the conventional maximum iteration count $k_a$, a minimum iteration count $k_{min}$ determined in advance, the standard deviation $\sigma_{noise}$ of the noise estimated in advance, and the standard deviation $\sigma_{init}$ of the initial residual component $V_{init}$ (step S10).

$$k'_{max} = \max\left(k_{min}, \min\left(k_{max}, \text{round}\left(k_{max} \times \frac{|\sigma_{noise} - \sigma_{init}|}{\sigma_{noise}}\right)\right)\right) \quad (17)$$

Here, a max function is a function for outputting a larger one of two input values, a min function is a function for outputting a smaller one of two input values, and a round function is a rounding function for rounding a value to an integer value. In the formula (17), in a case where values are close to each other between the standard deviation $\sigma_{noise}$ of the noise estimated in advance and the standard deviation $\sigma_{init}$ of $V_{init}$, i.e., in a case where a better initial solution is obtained, the iteration count of the T-V method is reduced. To the contrary, in a case where values are not close to each other between the standard deviation $\sigma_{noise}$ of the noise estimated in advance and the standard deviation $\sigma_{init}$ of $V_{init}$, i.e., in a case where a better initial solution could not be obtained, the iteration count of the T-V method is kept to a value close to $k_{max}$.

The skeleton component/residual component separation unit 101 applies the T-V method to the initial denoised image $U_{init}$ that was supplied from the initial denoised image generation unit 103 as the initial solution to separate a resulting image to a skeleton component $U_{T-V}$ composed of a strong edge and a flat area and a residual component $V_{T-V}$ composed of a texture and a noise according to the following formula (18) based on the iteration stop condition set by the iteration control unit 104.

$$U_{init} = U_{T-V} + V_{T-V} \quad (18)$$

The processing performed by the skeleton component/residual component separation unit 101 according to the present embodiment sets, different from the conventional method, the initial value as follows in step S1.

$$U_{T-V}^{(0)} = U_{init}$$

Further, in an iteration stop determination of step S3, the skeleton component/residual component separation unit 101 uses the following formula (19) as the iteration stop condition instead of the formula (4) of the conventional method.

$$\frac{1}{MN} \sum_{1 \le m \le M, 1 \le n \le N} (v_{m,n}^{(k)} - v_{m,n}^{(init)})^2 \approx \sigma_{noise}^2 \quad (19)$$

According to the formula (19), similar to the iteration stop condition of the conventional T-V method, the iteration of the T-V method can be controlled based on $\sigma_{noise}$. In a case where the standard deviation $\sigma_{init}$ of $V_{init}$ is close to $\sigma_{noise}$, narrowing of the to-be-searched area realizes a high-speed processing since the solution of the T-V method is converged with less iteration count. Further, in the iteration stop determination of step S4, k'$_{max}$ set in step S10 is used instead of k$_{max}$ of the conventional method. Meanwhile, the processing in each of steps S2 and S5 is equivalent to the corresponding one of the conventional method. Therefore, descriptions thereof are omitted here.

With the skeleton component $U_{T-V}$ being considered as an image from which noise was removed, a denoised image Z is obtained according to the following formula (20) (step S6).

$$Z = U_{T-V} \quad (20)$$

Figure 4:
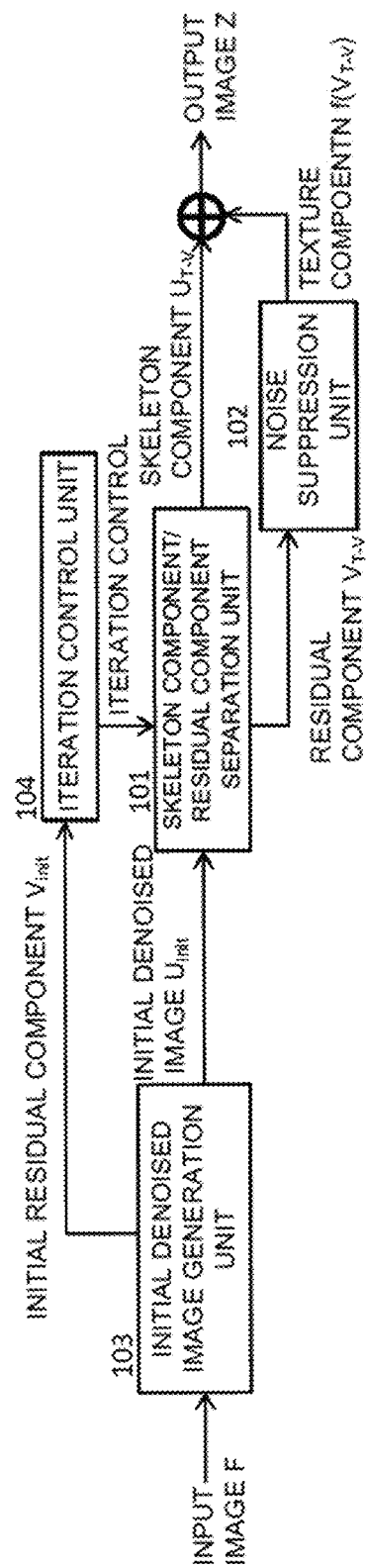
FIG. 4 is another explanatory chart illustrating the image processing method according to the first embodiment.
Figure 5:
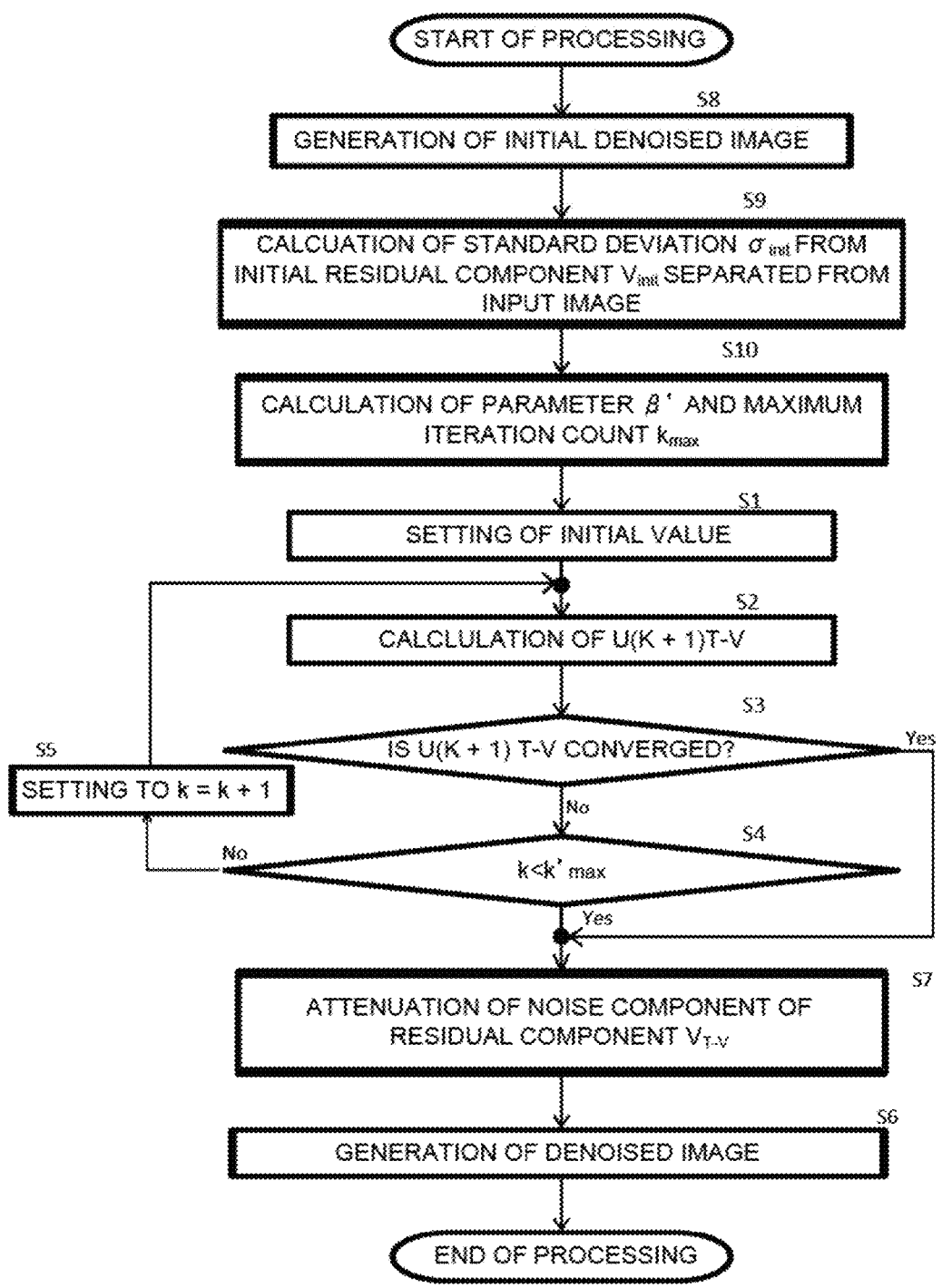
FIG. 5 is a flow chart illustrating exemplary steps of the image processing method according to the first embodiment.

As a matter of course, in the present embodiment, it is also possible to synthesize the residual component $V_{T-V}$ of which noise component is attenuated with the skeleton component $U_{T-V}$ according to a formula (21) and to output the denoised image Z. The image processing method of the present invention has a configuration illustrated in FIG. 4 and is shown by a flow chart of FIG. 5. The skeleton component/residual component separation unit 101 supplies the residual component $V_{T-V}$ separated by the skeleton component/residual component separation unit 101 to a noise suppression unit 102, where the effect of the function f for attenuating a noise component is applied to the residual component $V_{T-V}$ according to the following formula (21) (step S7). Then, a residual component $f(V_{T-V})$, of which noise component being attenuated, is synthesized with the skeleton component $U_{T-V}$ supplied from the skeleton component/residual component separation unit 101. A resulting image is output as the denoised image Z (step S6).

$$Z = U_{T-V} + f(V_{T-V}) \quad (21)$$

Figure 6:
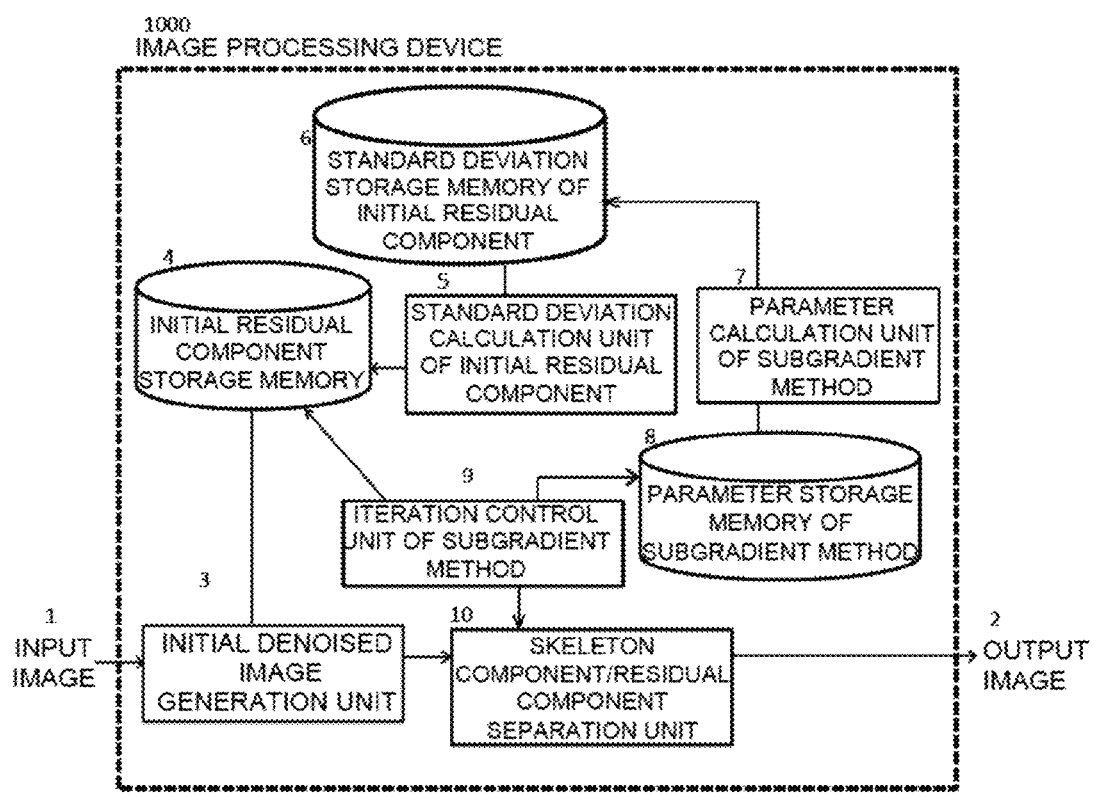
FIG. 6 is a block diagram illustrating an exemplary configuration of an image processing device according to the first embodiment.

Next, a specific image processing device to which the image processing method according to the first embodiment is applied will be described. FIG. 6 is an exemplary configuration of the image processing device according to the first embodiment.

An image processing device 1000 applies noise removal processing to an input image 1 and outputs the resulting image as an output image 2.

The image processing device 1000 includes an initial denoised image generation unit 3, an initial residual component storage memory 4, a standard deviation calculation unit 5 of the initial residual component, a standard deviation storage memory 6 of the initial residual component, a parameter calculation unit 7 of the subgradient method, a parameter storage memory 8 of the subgradient method, an iteration control unit 9 of the subgradient method, and a skeleton component/residual component separation unit 10.

When given the input image 1, in step S8, the initial denoised image generation unit 3 applies a light-weight noise removal method for storing the edge component to the input image 1 to generate an initial denoised image.

The initial residual component storage memory 4 stores the initial residual component separated from the input image 1 by initial denoised image generation unit 3.

The standard deviation calculation unit 5 of the initial residual component refers to the initial residual component storage memory 4 in order to calculate the standard deviation of the initial residual component according to the procedure described in step S9.

The standard deviation storage memory 6 of the initial residual component stores the standard deviation of the initial residual component that was calculated by the standard deviation calculation unit 5 of the initial residual component.

The parameter calculation unit 7 of the subgradient method refers to the standard deviation storage memory 6 of the initial residual component in order to calculate the parameter β' of the subgradient method and the maximum iteration count parameter k'$_{max}$ of the subgradient method according to the procedure described in step S10.

The parameter storage memory 8 of the subgradient method stores the parameter of the subgradient method that was calculated by the parameter calculation unit 7 of the subgradient method.

The iteration control unit 9 of the subgradient method refers to the initial residual component storage memory 4 and the parameter storage memory 8 of the subgradient method in order to control the iteration of the sugradient method in the skeleton component/residual component separation unit 10 according to the procedures described in step S3 and step S4.

Under the control of the iteration control unit 9 of the subgradient method, the skeleton component/residual component separation unit 10 executes the subgradient method using the initial denoised image supplied from the initial denoised image generation unit 3 as the initial solution, separates the initial denoised image to the skeleton component and the residual component, and outputs the skeleton component as the output image 2 according to the procedures described in steps S1, S2, S3, S4, and S5.

Meanwhile, the configuration of the image processing device illustrated in FIG. 6 is a mere example. Any other configuration may be employed so far as the device realizes the equivalent function with the configuration.

Further, a function of the image processing device 1000 can be realized by a computer. In other words, each of the components constituting the image processing device, i.e., the initial denoised image generation unit 3, the initial residual component storage memory 4, the standard deviation calculation unit 5 of the initial residual component, the standard deviation storage memory 6 of the initial residual component, the parameter calculation unit 7 of the subgradient method, the parameter storage memory 8 of the subgradient method, the iteration control unit 9 of the subgradient method, and the skeleton component/residual component separation unit 10, can be formed into a program for causing a central processing unit (CPU) of the computer to realize the above described functions.

In sum, a function of each of the components constituting the image processing device can be realized by a computer, i.e., in the form of a program. This applies not only to the first embodiment but also to other embodiments.

Figure 7:
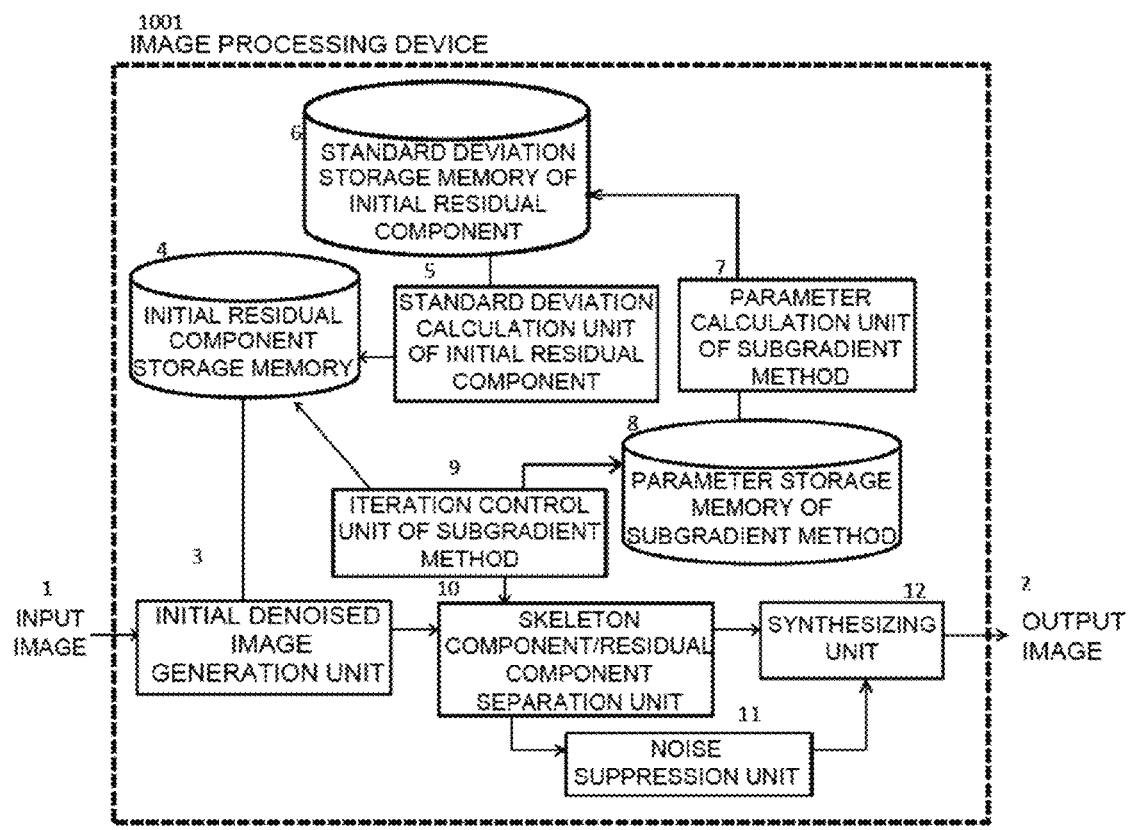
FIG. 7 is a block diagram illustrating another exemplary configuration of the image processing device according to the first embodiment.

Further, the image processing device 1000 may also be configured, similar to an image processing device 1001 illustrated in FIG. 7, to generate the output image 2 by synthesizing the residual component, of which noise component being attenuated, and the skeleton component.

The image processing device 1001 includes, similar to the image processing device 1000, the initial denoised image generation unit 3, the initial residual component storage memory 4, the standard deviation calculation unit 5 of the initial residual component, the standard deviation storage memory 6 of the initial residual component, the parameter calculation unit 7 of the subgradient method, the parameter storage memory 8 of the subgradient method, the iteration control unit 9 of the subgradient method, and the skeleton component/residual component separation unit 10. The above components perform processing as those of the image processing device 1000. Therefore, descriptions thereof are omitted here.

The image processing device 1001 includes, in addition to the image processing device 1000, a noise suppression unit 11 and a synthesizing unit 12.

The noise suppression unit 11 suppresses the noise component from the residual component that is supplied from the skeleton component/residual component separation unit 10 according to a procedure of step S7.

The synthesizing unit 12 synthesizes the skeleton component and the residual component (i.e., texture component), of which noise component being attenuated, to thereby generate the output image 2. The skeleton component is supplied from the skeleton component/residual component separation unit 10, and the residual component is supplied from the noise suppression unit 11.

The configuration of the image processing device illustrated in FIG. 7 is a mere example. Any other configuration may be employed so far as the device realizes the equivalent function with the configuration.

According to an aspect of the first embodiment, the light-weight noise removal method for storing the edge component is used to generate the initial denoised image, and thus obtained image is set to the initial solution of the T-V method. Further, the iteration count of the T-V method is controlled based on the residual component that was separated from the input image. This reduces the iteration count of the Chambolle's projection method required until the solution is converged. As a result, a calculation time is shortened.

Second Embodiment

A second embodiment of the present invention will be described below.

Figure 8:
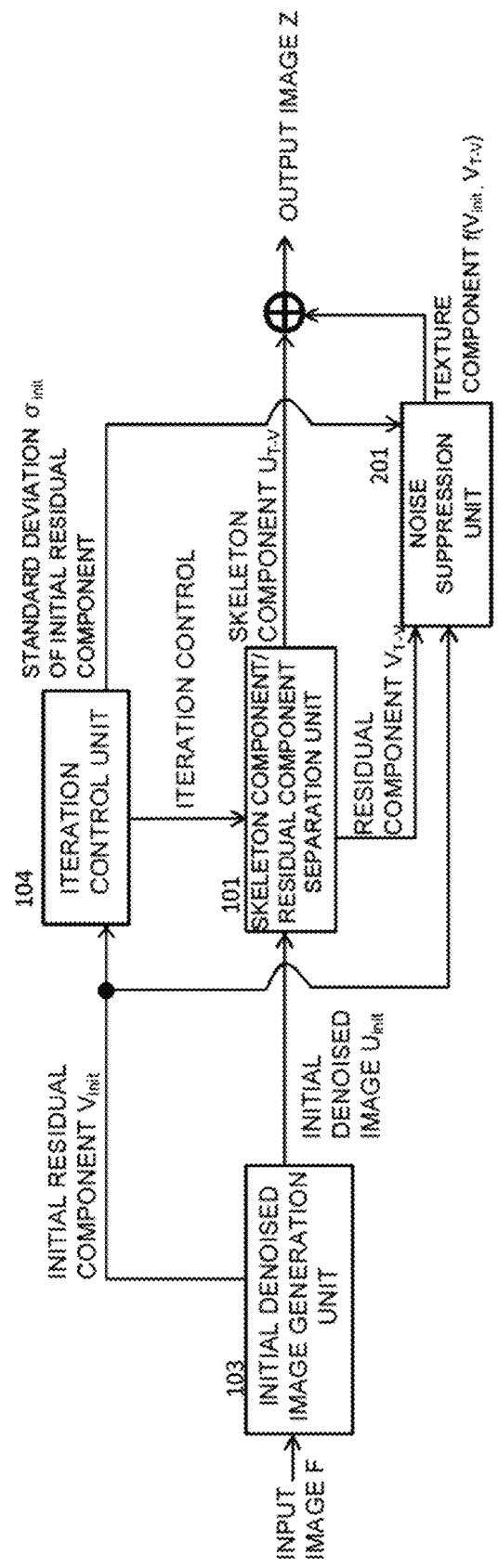
FIG. 8 is an explanatory chart illustrating an image processing method according to a second embodiment.

FIG. 8 is a functional block diagram illustrating an image processing method according to the second embodiment of the present invention.

The image processing method according to the second embodiment of the present invention is characterized by including the initial denoised image generation unit 103 that generates the initial denoised image by the light-weight noise removal method for storing the edge component in the input image, the iteration control unit 104 that controls the skeleton component/residual component separation unit 101 positioned in its downstream based on the initial residual component separated from the input image in the initial denoised image generation unit 103, the skeleton component/residual component separation unit 101 that separates the image to the skeleton component and the residual component as illustrated in FIG. 19, and a noise suppression unit 201 that suppresses the initial residual component separated from the input image in the initial denoised image generation unit 103 and noise of the residual component separated from an initial denoised image in the skeleton component/residual component separation unit that separates the image to the skeleton component and the residual component based on the T-V method based on a standard deviation of the initial residual component that was separated from the input image in the initial denoised image generation unit 103.

Meanwhile, the skeleton component/residual component separation method for separating the image to the skeleton component and the residual component will be described below using the conventional T-V method. However, this should not be construed in a limiting sense.

Figure 9:
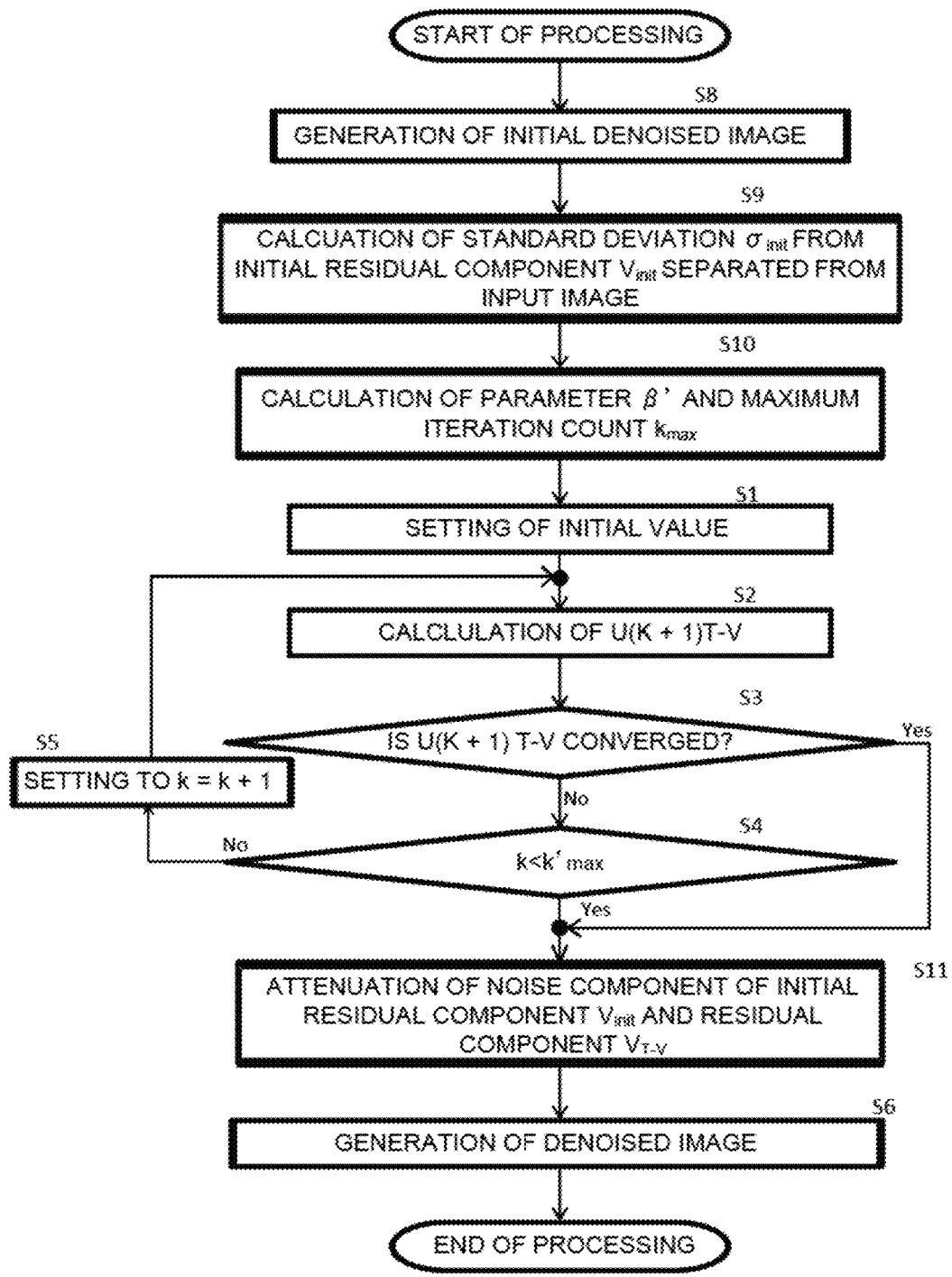
FIG. 9 is a flow chart illustrating exemplary steps of the image processing method according to the second embodiment.

FIG. 9 is a flow chart illustrating the image processing method according to the second embodiment of the present invention.

A flow of the processing will be described below.

The input image F is supplied to the initial denoised image generation unit 103.

The initial denoised image generation unit 103 applies the light-weight noise removal method for storing the edge component to the input image F, thereby generating the initial denoised image $U_{init}$ (step S8). The initial denoised image generation unit 103 further separates the initial residual component $V_{init}$ composed of a texture and a noise from the input image F. The light-weight noise removal method for storing the edge component is identical to that of the first embodiment. Therefore, a description thereof is omitted here. Thus generated initial denoised image $U_{init}$ is supplied to the skeleton component/residual component separation unit 101. The second embodiment differs from the first embodiment in that the separated initial residual component $V_{init}$ is supplied not only to the iteration control unit 104 but also to the noise suppression unit 201.

The iteration control unit 104 controls the iteration of the T-V method based on the initial residual component $V_{init}$ supplied from the initial denoised image generation unit 103. The steps S9 and S10 for the iteration control method are identical to those of the first embodiment. Therefore, descriptions thereof are omitted here. The second embodiment differs from the first embodiment in that a standard deviation $\sigma_{init}$ of the initial residual component $V_{init}$ calculated in step S9 is supplied to the noise suppression unit 201.

The skeleton component/residual component separation unit 101 applies the T-V method to the initial denoised image $U_{init}$ supplied from the initial denoised image generation unit 103 as the initial solution. Then, the skeleton component/residual component separation unit 101 separates the image to the skeleton component $U_{T-V}$ composed of a strong edge and a flat area and the residual component $V_{T-V}$ composed of a texture and a noise based on the iteration stop condition set by the iteration control unit 104. The steps S1, S2, S3, S4, and S5 for the separating method are identical to those of the first embodiment. Therefore, descriptions thereof are omitted here. The residual component $V_{T-V}$ is supplied to the noise suppression unit 201.

The noise suppression unit 201 causes the function f for attenuating the noise component to work on the residual component $V_{init}$ that was supplied from the initial denoised image generation unit 103 and the residual component $V_{T-V}$ that was supplied from the skeleton component/residual component separation unit 101 based on the standard deviation $\sigma_{init}$ of the residual component $V_{init}$ supplied from the iteration control unit 104, thereby generating the residual component $f(V_{init}, V_{T-V})$ with attenuated noise component (step S11).

In step S11, the function f is configured based on the formula (11) as a basic formula. For example, it is possible to configure the function f, using thresholds $\tau_1$ and $\tau_2$ and coefficients $\gamma_1$ and $\gamma_2$, by applying a combination of the soft evaluation threshold processing and the factor processing to each of the residual components $V_{init}$ and $V_{T-V}$ according to the following formula (22).

$$f(V_{init}, V_{T-V}) = f_{soft\text{-}factor}(V_{init}, \tau_1, \gamma_1) + f_{soft\text{-}factor}(V_{T-V}, \tau_2, \gamma_2) \quad (22)$$

Here, $\tau_1$ and $\tau_2$ are set as follows using the standard deviation $\sigma_{noise}$ of the noise of the target image estimated in advance and the standard deviation $\sigma_{init}$ of the initial residual component supplied from the iteration control unit 104.

$$\tau_1 = a_1 \times \sigma_{init}$$

$$\tau_2 = a_2 \times (\sigma_{noise} - \sigma_{init}) \quad (23)$$

Here, $a_1$ and $a_2$ represent coefficients.

Also, where $\gamma_1 = 0$ is satisfied, it is also possible to attenuate, as illustrated in FIG. 2 according to the first embodiment, the noise component only from the residual component $V_{T-V}$ separated by the skeleton component/residual component separation unit 101. In this case, also, the second embodiment differs from the first embodiment in that the attenuation amount of the noise component is set based on the standard deviation $\sigma_{init}$ of the initial residual component $V_{init}$ supplied from the iteration control unit 104.

As a matter of course, an order may be reversed with respect to the soft evaluation threshold processing and the factor processing, and/or the hard evaluation threshold processing may be combined therewith. The function f is not limited to the formula (22). Any function may be employed instead of the function f so far as the processing has an equivalent effect.

Finally, according to the following formula (24), the skeleton component $U_{T-V}$ that is supplied from the skeleton component/residual component separation unit 101 is synthesized with the residual component (i.e., texture component) $f(V_{init}, V_{T-V})$, of which noise component being attenuated, supplied from the noise suppression unit 201 to thereby obtain the denoised image Z (step S6).

$$Z = U_{T-V} + f(V_{init}, V_{T-V}) \quad (24)$$

Based on the above described operation, the image processing method of the present invention generates the denoised image.

Figure 10:
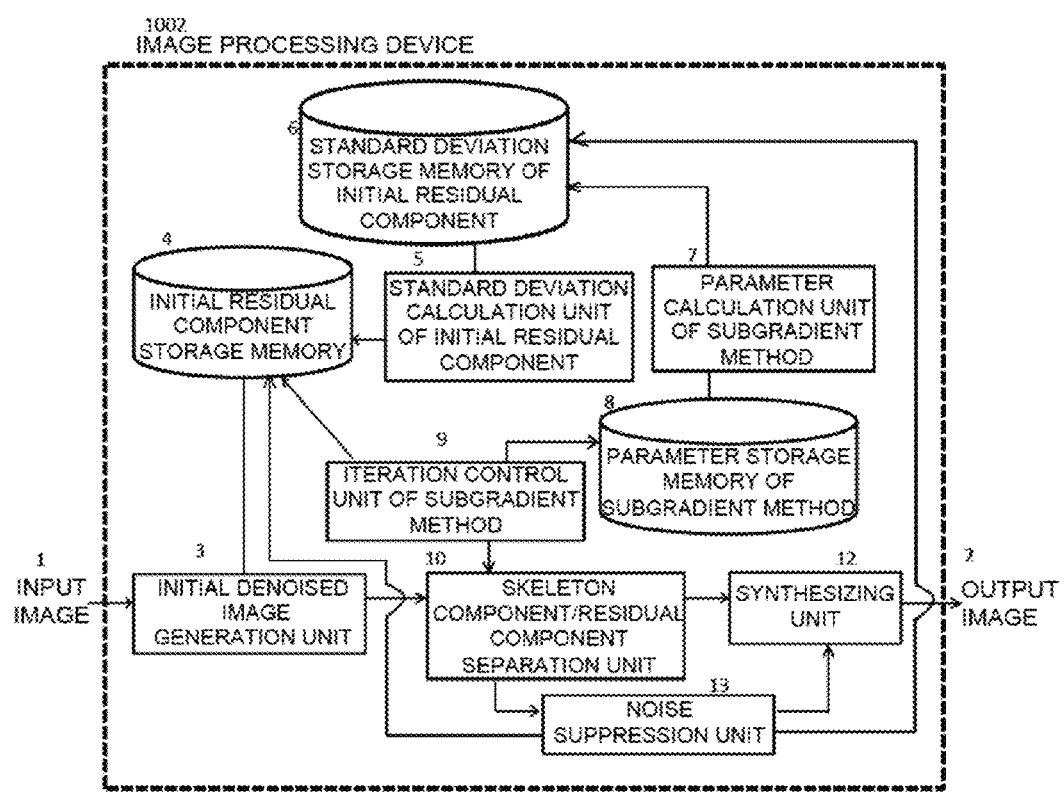
FIG. 10 is a block diagram illustrating an exemplary configuration of an image processing device according to the second embodiment.

Next, an image processing device to which the image processing method of the second embodiment is applied will be described. FIG. 10 illustrates an exemplary configuration of the image processing device according to the second embodiment.

An image processing device 1002 removes noise from the input image 1 to output it as the output image 2.

The image processing device 1002 includes, similar to the image processing device 1001 of FIG. 7, the initial denoised image generation unit 3, the initial residual component storage memory 4, the standard deviation calculation unit 5 of the initial residual component, the standard deviation storage memory 6 of the initial residual component, the parameter calculation unit 7 of the subgradient method, the parameter storage memory 8 of the subgradient method, the iteration control unit 9 of the subgradient method, the skeleton component/residual component separation unit 10, and the synthesizing unit 12. Processing of each of these components is identical to each corresponding one of the image processing device 1001. Therefore, descriptions thereof are omitted here.

The image processing device 1002 further includes a noise suppression unit 13 that executes processing different from processing of the image processing device 1001.

The noise suppression unit 13 suppresses the noise component according to a procedure of step S11 from the initial residual component that is obtainable by referring to the initial residual component storage memory 4 and the residual component that is supplied from the skeleton component/residual component separation unit 10 based on the standard deviation of the initial residual component that is obtainable by referring to the standard deviation storage memory 6 of the initial residual component.

A configuration of the image processing device illustrated in FIG. 10 is a mere example. Any other configuration may be employed so far as the device realizes the equivalent function with the configuration.

According to an aspect of the second embodiment, it is possible to smoothly remove noise while better preserving the edge and the texture by synthesizing not only the residual component that was separated by the T-V method but also the initial residual component that was separated upon generation of the initial denoised image, of which noise component being attenuated, with the skeleton component based on the residual component that was separated upon generation of the initial denoised image.

Third Embodiment

A third embodiment of the present invention will be described below.

In the third embodiment, an image processing method having better edge preservability than that of the image processing method of the first embodiment will be described below.

It is possible to realize the smooth noise removal while preserving the edge and the texture also according to the first embodiment and the second embodiment. However, in those embodiments, there may be a case where the noise is excessively suppressed by the T-V method depending on an image, which invites degradation of the resolution feeling. Therefore, in the third embodiment, an image processing method in which the noise is capable of being removed smoothly as well as capable of preventing excessive suppression of noise will be described.

Figure 11:
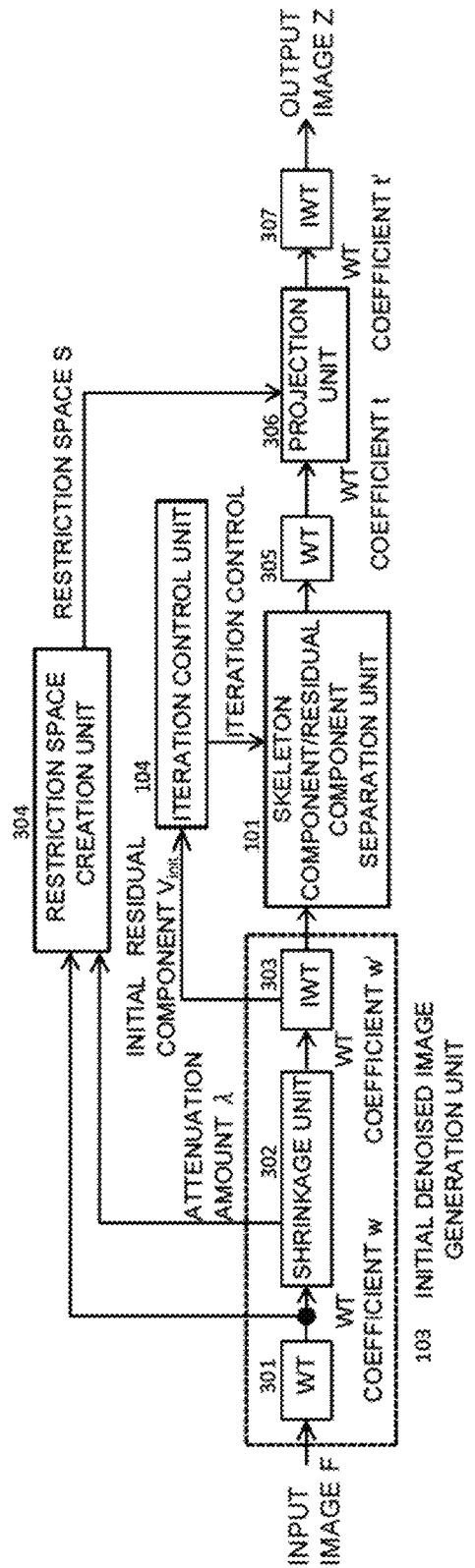
FIG. 11 is an explanatory chart illustrating an image processing method according to a third embodiment.

FIG. 11 is a functional block diagram illustrating the image processing method according to the third embodiment of the present invention.

The image processing method according to the third embodiment of the present invention is characterized by including the initial denoised image generation unit 103 that generates the initial denoised image based on the WS method, the iteration control unit 104 that controls the skeleton component/residual component separation unit positioned in its downstream based on the initial residual component that was separated from the input image in the initial denoised image generation unit 103, the skeleton component/residual component separation unit 101 that separates the image to the skeleton component and the residual component as illustrated in FIG. 19, a restriction space creation unit 304 that creates a space for restricting the skeleton component generated by the skeleton component/residual component separation unit 101 based on the wavelet transform coefficient that is calculated in the course of the generation of the initial denoised image and the noise attenuation amount in the initial denoised image generation unit 103, and a projection unit 306 that projects the wavelet transform coefficient of the skeleton component generated in the skeleton component/residual component separation unit 101 to a restriction space that is created in the restriction space creation unit 304.

Meanwhile, the skeleton component/residual component separation method for separating the image to the skeleton component and the residual component will be described below referring to the conventional T-V method. However, this should not be construed in a limiting sense.

Figure 12:
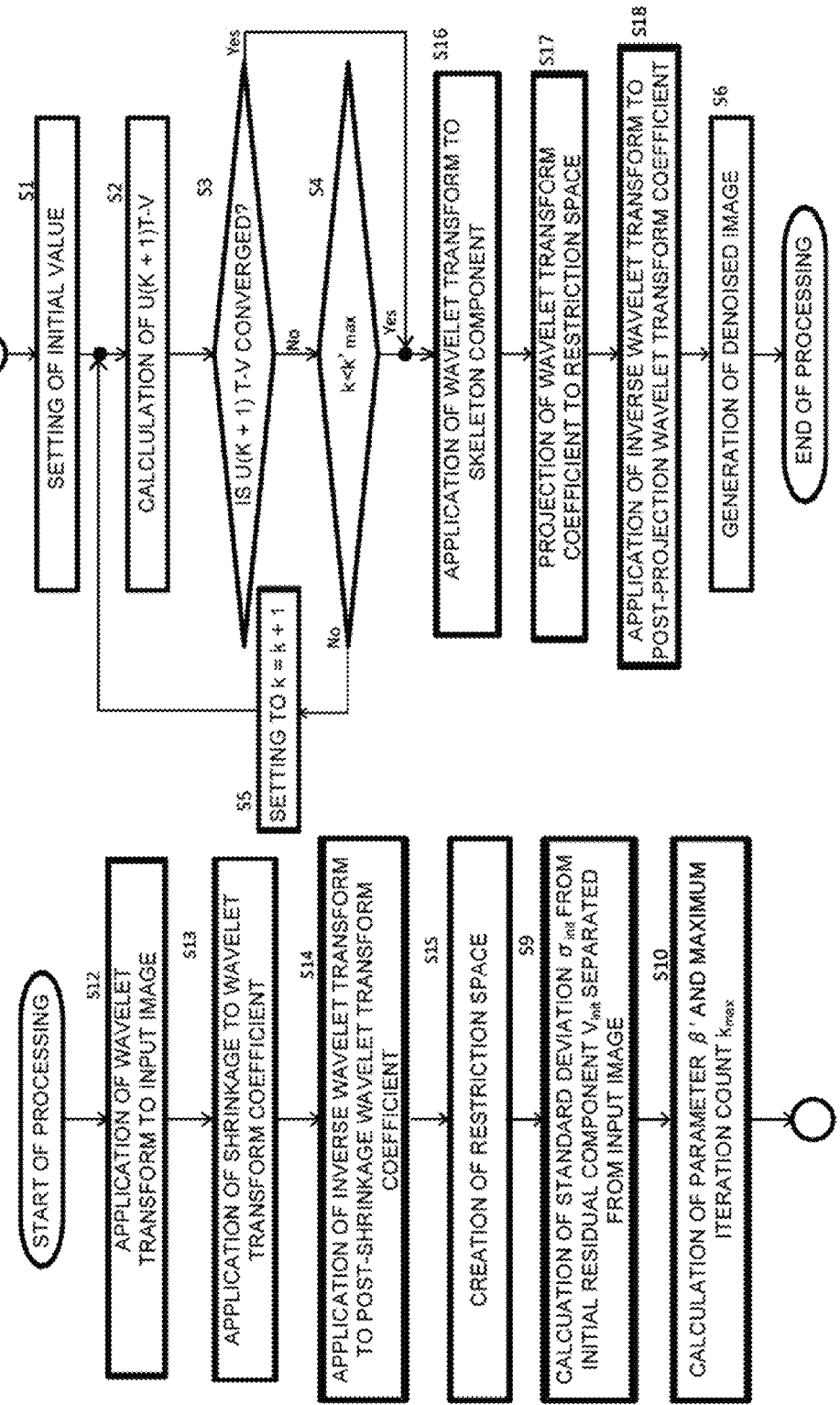
FIG. 12 is a flow chart illustrating exemplary steps of the image processing method according to the third embodiment.

FIG. 12 is a flow chart illustrating the image processing method according to the first embodiment.

Hereinafter, a flow of processing will be described.

The input image is supplied to the initial denoised image generation unit 103.

The initial denoised image generation unit 103 generates the initial denoised image using the WS method.

Initially, the wavelet transform unit 301 applies the wavelet transform to the supplied input image (step S12), and supplies a wavelet transform coefficient to a Shrinkage unit 302 and the restriction space creation unit 304, respectively.

The Shrinkage unit 302 applies the Shrinkage to the wavelet transform coefficient supplied from the wavelet transform unit 301 (step S13). For example, the processing according to each of the formula (13) and the formula (14) is applicable as a form of the Shrinkage. Further, the Shrinkage unit 302 supplies a post-Shrinkage wavelet transform coefficient to the inverse wavelet transform unit 303 and supplies an attenuation amount X of the Shrinkage to the restriction space creation unit 304.

The inverse wavelet transform unit 303 applies the inverse wavelet transform to the post-Shrinkage wavelet transform coefficient that was supplied from the Shrinkage unit 302 (step S14) to obtain the initial denoised image $U_{init}$ and the residual component $V_{init}$. Then, the inverse wavelet transform unit 303 supplies thus obtained initial denoised image $U_{init}$ to the skeleton component/residual component separation unit 101 as well as supplies thus obtained initial residual component $V_{init}$ to the iteration control unit 104.

The restriction space creation unit 304 creates a restriction space S using the wavelet transform coefficient that was supplied from the wavelet transform unit 301 and the attenuation amount λ that was supplied from the Shrinkage unit 302 (step S15).

Where a height of the input image is M, a width thereof is N, a coordinate position in a vertical direction in the image is m, a coordinate position in a horizontal direction in the image is n, and a wavelet transform coefficient is w, a restriction space S is represented by the following formula (25).

$$S=\{s_{m,n} \in R^{M \times N}: \forall m,n, (WT(s))_{m,n} \in [W_{m,n}^-, W_{m,n}^+]\}$$

$$W_{m,n}^- = w_{m,n} - c \times \lambda,$$

$$W_{m,n}^+ = w_{m,n} + c \times \lambda \quad (25)$$

Meanwhile, in the formula, the WT(•) represents the wavelet transform, and c represents a coefficient. The formula (25) shows that, when the wavelet transform is applied to the restriction space S, a wavelet transform coefficient thereof exists within a range of =c×λ of the wavelet transform coefficient of the input image.

Thus created restriction space S is supplied to the projection unit 306.

The iteration control unit 104 controls the iteration of the T-V method based on the noise component $V_{init}$ that is supplied from the inverse wavelet transform unit 303. Steps S9 and S10 for the iteration control method are identical to those of the first embodiment. Therefore, descriptions thereof are omitted here.

The skeleton component/residual component separation unit 101 applies the T-V method to the initial denoised image $U_{init}$ that was supplied as an initial solution from the initial denoised image generation unit 103. Then, the skeleton component/residual component separation unit 101 separates the image to the skeleton component $U_{T-V}$ and the residual component $V_{T-V}$ composed of a texture and a noise based on the iteration stop condition set by the iteration control unit 104. Steps S1, S2, S3, S4, and S5 for separating method are identical to those of the first embodiment. Therefore, descriptions thereof are omitted here. The skeleton component/residual component separation unit 101 supplies thus obtained skeleton component $U_{T-V}$ to a wavelet transform unit 305.

The wavelet transform unit 305 applies the wavelet transform to the skeleton component $U_{T-V}$ that was supplied from the skeleton component/residual component separation unit 101 (step S16) and supplies a wavelet transform coefficient to the projection unit 306

The projection unit 306 uses the restriction space S that was supplied from the restriction space creation unit 304 and the wavelet transform coefficient that was supplied from the wavelet transform unit 305 to perform projection processing according to the following formula (26) (step S17).

$$t_{m,n}' = \max(\min(t_{m,n}, W_{m,n}^+), W_{m,n}^-) \quad (26)$$

Meanwhile, t is the wavelet transform coefficient resulting from the application of the wavelet transform to the skeleton component $U_{T-V}$ that was output from the wavelet transform unit 305, and t' is the wavelet transform coefficient output as a result of the application of the projection processing to the restriction space S.

More specifically, in the third embodiment, the wavelet transform coefficient of the output image Z is restricted to be varied within the range of ±c×λ of a wavelet transform coefficient $w_{m,n}$ of the input image F. This ensures prevention of noise from the excessive suppression.

Further, the projection unit 306 supplies a post-projection wavelet transform coefficient according to the formula (26) to an inverse wavelet transform unit 307.

The inverse wavelet transform unit 307 applies the inverse wavelet transform to the wavelet transform coefficient that was supplied from the projection unit 306 (step S18) to thereby obtain the noise-removed output image.

Based on the above described operation, the image processing method of the present invention generates the denoised image.

Figure 13:
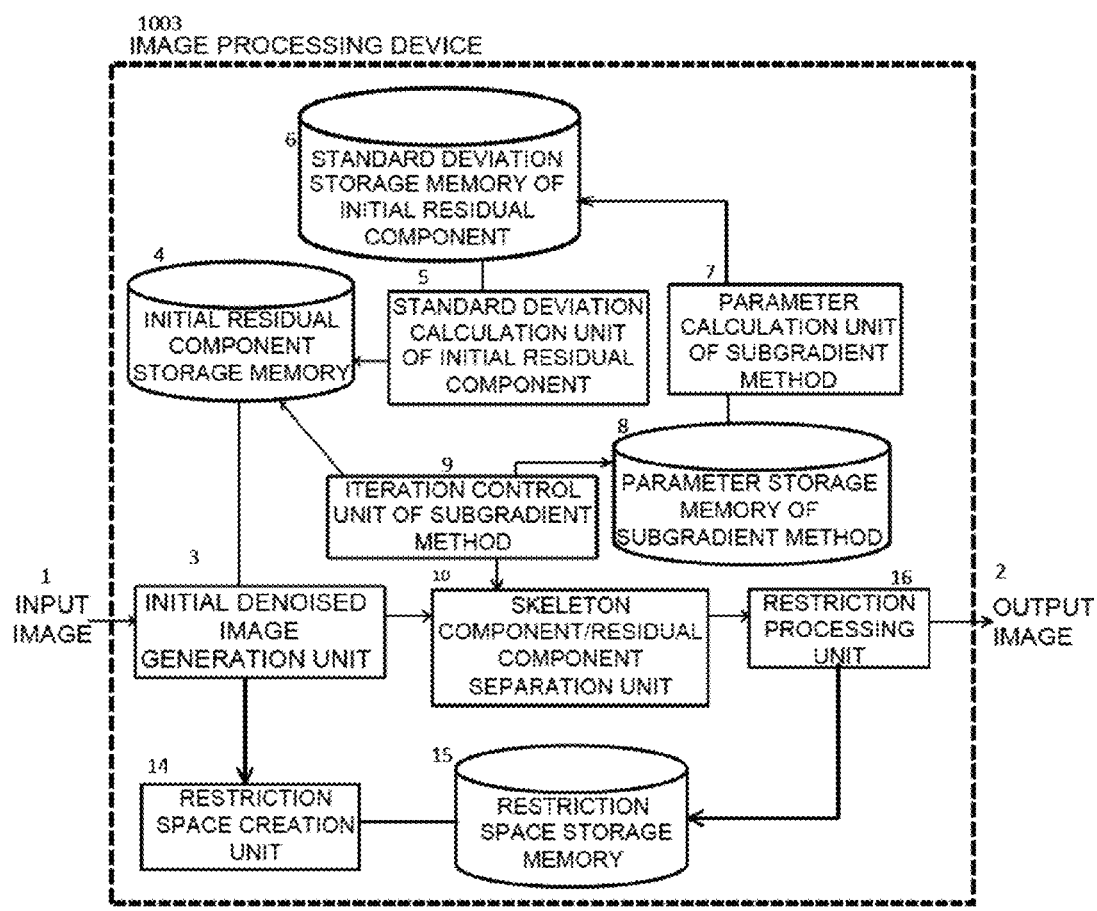
FIG. 13 is a block diagram illustrating an exemplary configuration of an image processing device according to the third embodiment.

Next, a specific image processing device for executing the image processing method according to the third embodiment will be described. FIG. 13 illustrates an exemplary configuration of the image processing device according to the third embodiment.

An image processing device 1003 applies image processing to the input image 1 and outputs the image as the output image 2.

The image processing device 1003 includes, similar to the image processing device 1000 of FIG. 7, the initial residual component storage memory 4, the standard deviation calculation unit 5 of the initial residual component, the standard deviation storage memory 6 of the initial residual component, the parameter calculation unit 7 of the subgradient method, the parameter storage memory 8 of the subgradient method, the iteration control unit 9 of the subgradient method, the skeleton component/residual component separation unit 10, a restriction space creation unit 14, a restriction storage memory 15, and a restriction processing unit 16. Processing performed by each of the components is identical to each corresponding one of the image processing device 1000. Therefore, descriptions thereof are omitted here.

The initial denoised image generation unit 3 carries out initial denoised image generation using the WS method according to the procedures of steps S12, S13, and S14. Then, the initial denoised image generation unit 3 supplies the wavelet transform coefficient and the attenuation amount that are obtainable in the course of the initial denoised image generation to the restriction space creation unit 14.

The restriction space creation unit 14 creates a restriction space according to the procedure of step S15 based on the wavelet transform coefficient and the attenuation amount that are supplied from the initial denoised image generation unit 3.

The restriction processing unit 16 restricts a variation range of the skeleton component according to the procedures of steps S16, S17, and S18 based on the skeleton component supplied from the skeleton component/residual component separation unit 10 and the restriction space supplied from the restriction space creation unit 14.

The configuration of the image processing device illustrated in FIG. 13 is a mere example. Any other configuration may be employed so far as the device realizes the equivalent function with the configuration.

According to the third embodiment, a problem of degradation of the resolution feeling caused by the excessive suppression of noise by the T-V method is solved, and therefore, the smooth noise removal becomes possible while the edge and the texture are better preserved.

Figure 14:
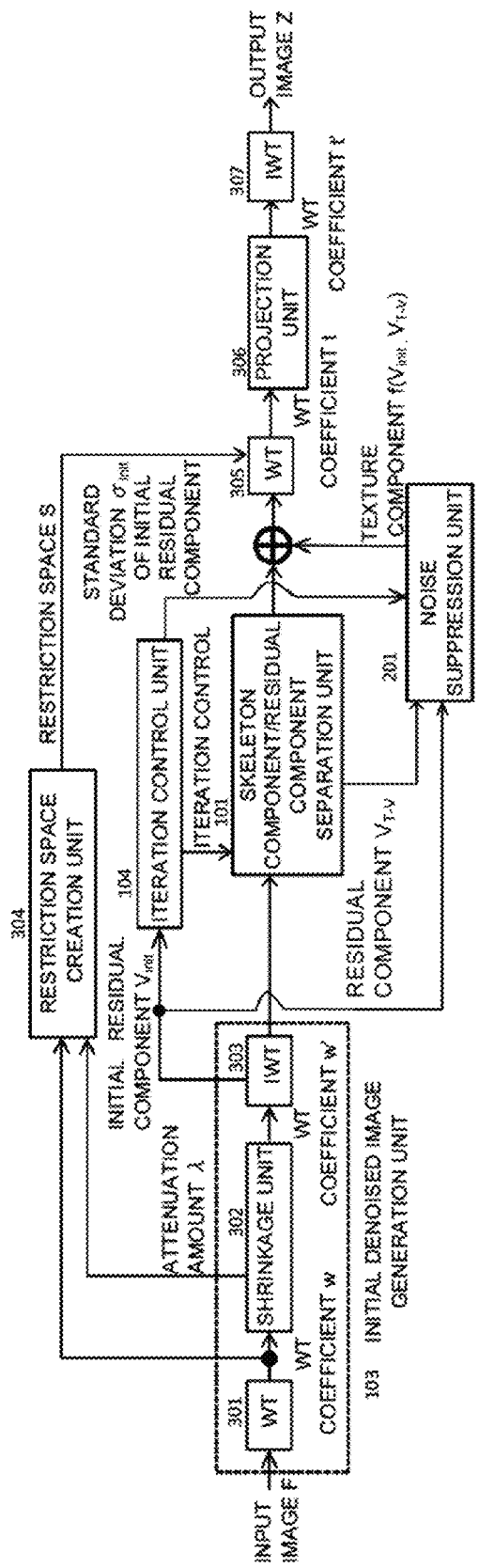
FIG. 14 is an explanatory chart illustrating the image processing method according to the third embodiment.

Meanwhile, a combination of the third embodiment and the second embodiment ensures realization of the image processing method by which the edge and the texture are better preserved. The configuration of which is illustrated in FIG. 14. A description of processing thereof is omitted here.

Fourth Embodiment

A fourth embodiment of the present invention will be described below.

Figure 15:
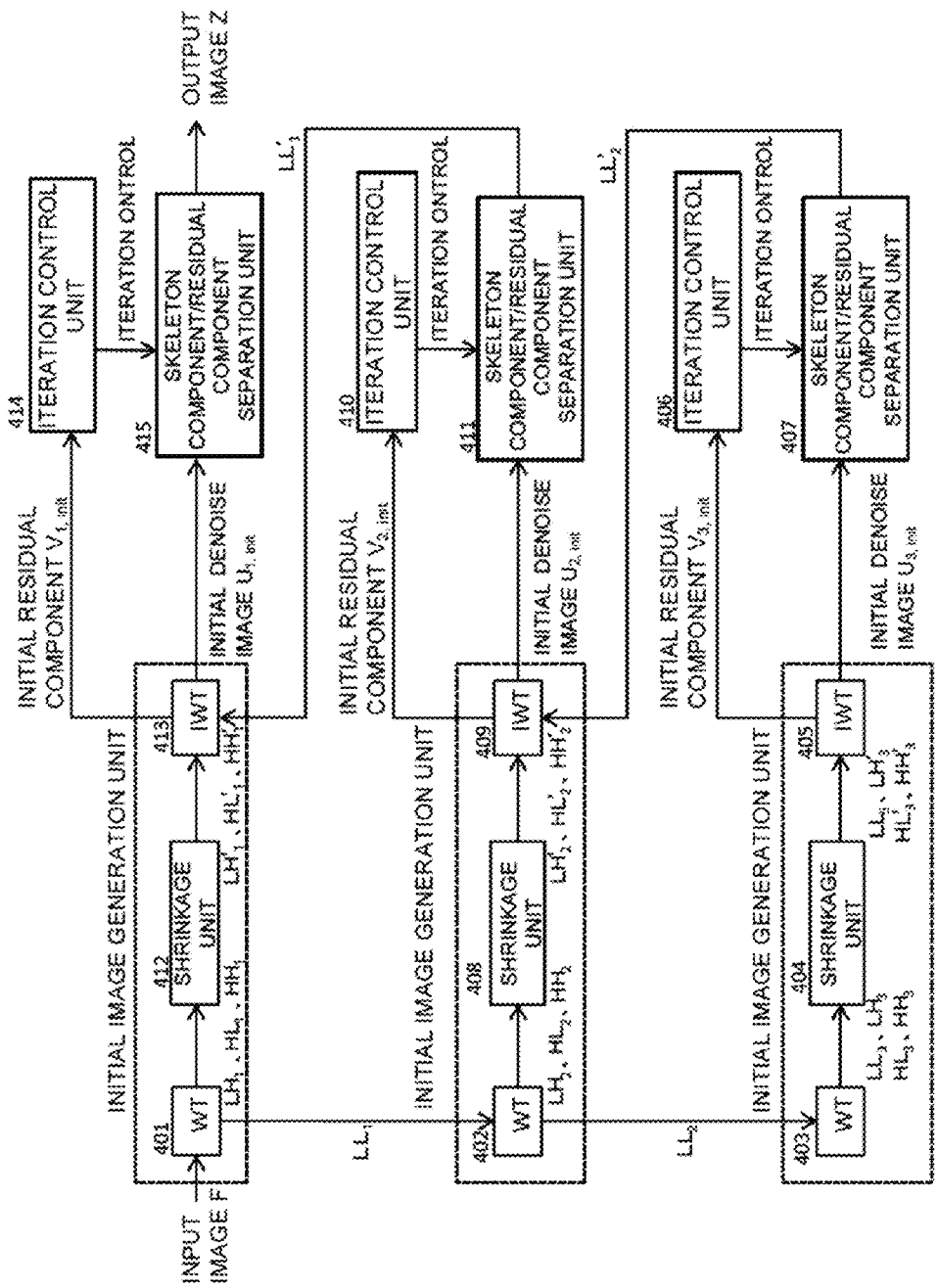
FIG. 15 is an explanatory chart illustrating an image processing method according to a fourth embodiment.

FIG. 15 is a functional block diagram illustrating an image processing method according to the fourth embodiment of the present invention.

The fourth embodiment is directed to an image processing method having a better low-frequency noise removal performance than the image processing method according to the first embodiment.

Figure 16:
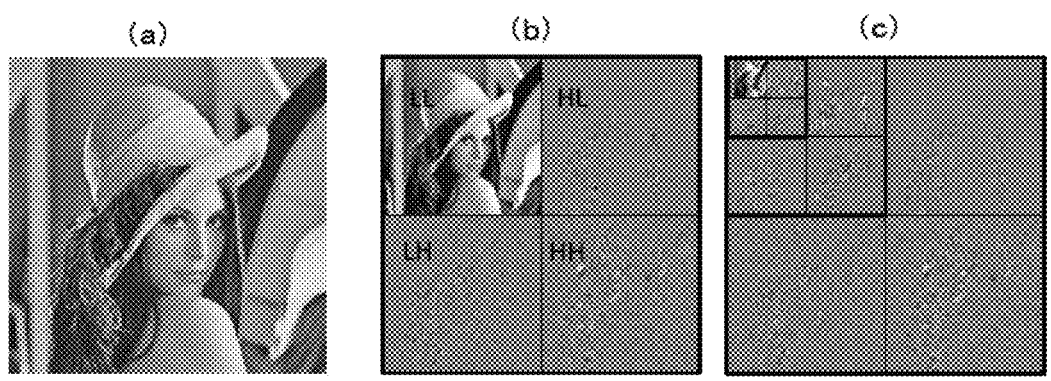
FIG. 16(*a*) is an original image.

FIG. 15 illustrates a flow of processing in a case of applying the wavelet transform to a multiresolution image of a three-layer structure. However, the processing can be applied also to a structure other than the three-layer structure. FIG. 16 illustrates an example of the multiresolution wavelet transform. FIG. 16(*a*) illustrates an original image. FIG. 16(*b*) illustrates an image in which the wavelet transform is applied to a first layer. FIG. 16(*c*) illustrates an image in which the wavelet transform is applied to a third layer. In FIG. 16(*b*), L represents a low frequency side, and H represents a high frequency side. A combination of L and H expresses a subband. For example, LH means that the horizontal direction is on the low frequency side and the vertical direction is on the high frequency side. A recursive application of the wavelet transform to the LL component in FIG. 16(*b*) realizes the multiresolution wavelet transform as illustrated in FIG. 16(*c*). Hereinafter, in the multiresolution wavelet transform, the LL component in a $k^{th}$ layer is noted by $LL_k$. Each of a LH component, a HL component, and a HH component of the $k^{th}$ layer is noted in a similar manner.

The LL component of the multiresolution wavelet transform takes a roll of the wavelet transform coefficient as well as a reduced image of the original image. For example, the LL component in the third layer when the multiresolution wavelet transform was executed for the three-layer structure is a reduced image reduced to 8 times of the original image in both of the horizontal direction and the vertical direction, resulting in having a resolution reduced to 64 times of the original image. Since the T-V method is noise removal processing for an image area, the T-V method is executable with respect to the wavelet transform coefficient of the LL component. The LL component in a deep layer is deemed as being composed of the low frequency component of the original image. Therefore, execution of the denoise processing in the deep layer ensures removal of the low frequency noise.

Figure 17:
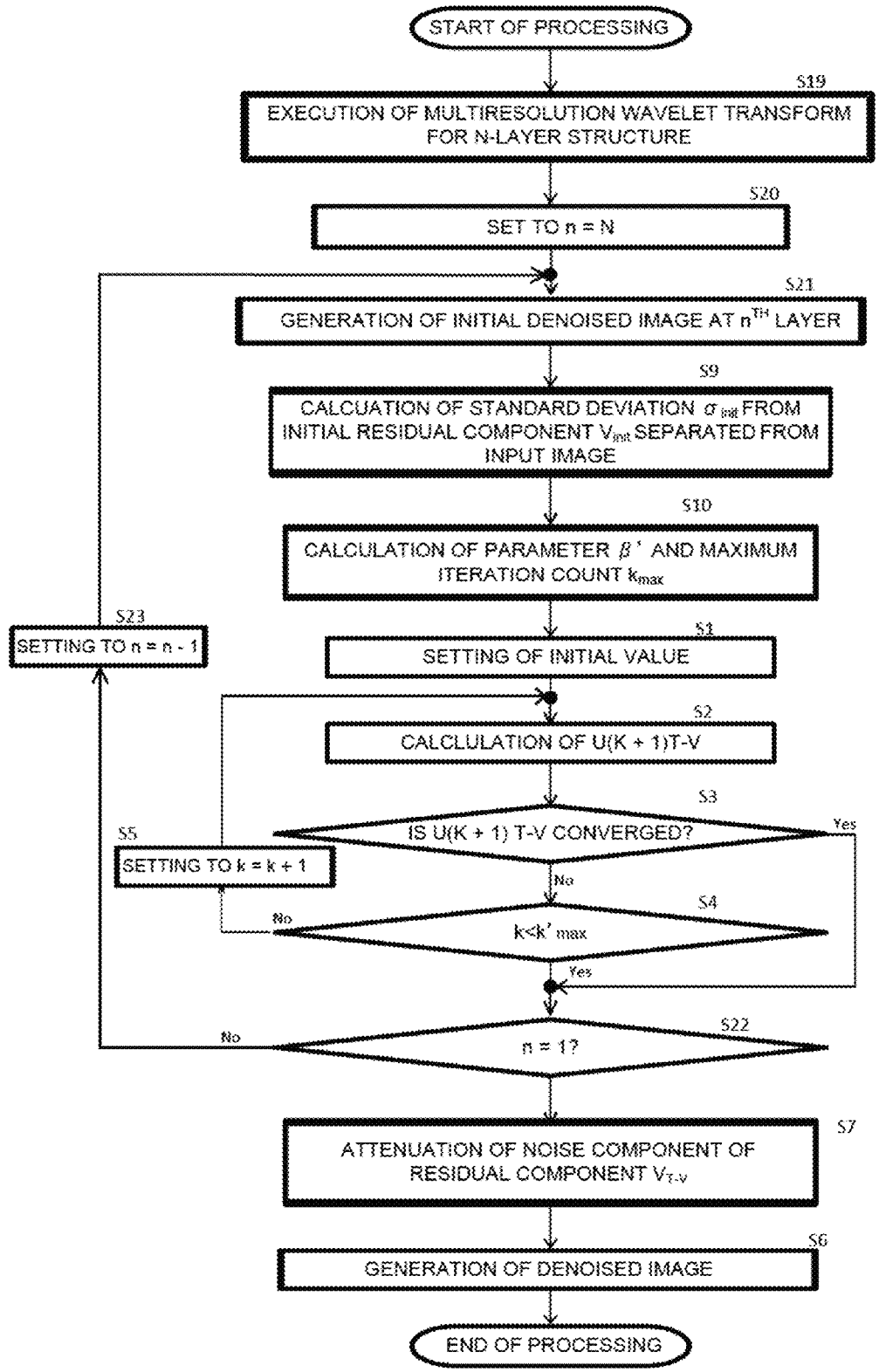
FIG. 17 is a flow chart illustrating exemplary steps of the image processing method according to the fourth embodiment.

FIG. 17 is a flow chart illustrating the image processing method according to the fourth embodiment.

Hereinafter, a flow of the processing will be described.

The input image F is supplied to a wavelet transform unit 401.

The wavelet transform unit 401 applies the wavelet transform to the supplied input image F and supplies a $LL_1$ component of the wavelet transform coefficient to a wavelet transform unit 402. The $LL_1$ component at this point is a reduced image having a resolution reduced to 4 times of the original image. Further, the wavelet transform unit 401 supplies a $LH_1$ component, a $HL_1$ component, and a $HH_1$ component to a Shrinkage unit 412.

The wavelet transform unit 402 applies the wavelet transform to the $LL_1$ component of the first layer that was supplied from the wavelet transform unit 401 and supplies thus obtained $LL_2$ component of the wavelet transform coefficient to a wavelet transform unit 403. The $LL_2$ component at this point is a reduced image having a resolution reduced to 16 times of the original image. Further, the wavelet transform unit 402 supplies a $LH_2$ component, a $HL_2$ component, and a $HH_2$ component to a Shrinkage unit 408.

The wavelet transform unit 403 applies the wavelet transform to the $LL_2$ component of the second layer that was supplied from the wavelet transform unit 402 and supplies thus obtained wavelet transform coefficients $LL_3$, $LH_3$, $HL_3$, and $HH_3$ to a Shrinkage unit 404.

At this point, the multiresolution wavelet transform is realized for the three-layer structure (step S19). Subsequently, the wavelet transform unit 403 executes the noise removal processing starting from a layer having the lowest resolution (step S20).

The Shrinkage unit 404 applies the Shrinkage processing to the wavelet transform coefficients that were supplied from the wavelet transform unit 403 and supplies post-Shrinkage wavelet transform coefficients to an inverse wavelet transform unit 405.

The inverse wavelet transform unit 405 applies the inverse wavelet transform to the wavelet transform coefficients supplied from the Shrinkage unit 404 to generate an initial denoised image $U_{3,\ init}$ having a resolution reduced to 16 times of the original image (step S21). Then, the inverse wavelet transform unit 405 supplies the resulting image to a skeleton component/residual component separation unit 407. The inverse wavelet transform unit 405 also supplies an initial residual component $V_{3,\ init}$ separated from the input image F to an iteration control unit 406.

The iteration control unit 406 controls the iteration of the T-V method in the skeleton component/residual component separation unit 407 based on the initial residual component $V_{3, init}$ supplied from the inverse wavelet transform unit 405. Steps S9 and S10 for the iteration control method are identical to those of the first embodiment. Therefore, descriptions thereof are omitted here.

The skeleton component/residual component separation unit 407 applies the T-V method to the initial denoised image $U_{3, init}$ that was supplied from the inverse wavelet transform unit 405 as an initial solution. Then, the skeleton component/residual component separation unit 407 separates the resulting image to a skeleton component $U_{3, T-V}$ and a residual component $V_{3, T-V}$ composed of a texture and a noise based on the iteration stop condition set by the iteration control unit 406. Steps S1, S2, S3, S4, and S5 for the separation method are identical to those of the first embodiment. Therefore, descriptions thereof are omitted here. Since there remains an unprocessed upper layer (step S22), the skeleton component/residual component separation unit 407 supplies thus obtained skeleton component $U_{3, T-V}$ to an inverse wavelet transform 409 as a $LL'_2$ component of the wavelet transform coefficient.

After the completion of the processing at the third layer, processing continuously starts at the second layer (step S23).

The Shrinkage unit 408 applies the Shrinkage processing to the $LH_2$ component, the $HL_2$ component, and the $HH_2$ component of the wavelet transform coefficient supplied from the wavelet transform unit 402. The Shrinkage unit 408 supplies a post-Shrinkage $LH'_2$ component, a post-Shrinkage $HL'_2$ component, and a post-Shrinkage $HH'_2$ component to an inverse wavelet transform unit 409.

The inverse wavelet transform unit 409 applies the inverse wavelet transform to the image using the $LH'_2$ component, the $HL'_2$ component, and the $HH'_2$ component of the wavelet transform coefficient that are supplied from the Shrinkage unit 408 and the $LL'_2$ component of the wavelet transform coefficient that is supplied from the skeleton component/residual component separation unit 407 to generate an initial denoised image $U_{2, init}$ having a resolution reduced to 4 times of the original image (step S21). Then, the inverse wavelet transform unit 409 supplies the resulting image to a skeleton component/residual component separation unit 411. Also, the inverse wavelet transform unit 409 supplies an initial residual component $V_{2, init}$ that was separated from the input image F to an iteration control unit 410.

The iteration control unit 410 controls the iteration of the T-V method in the skeleton component/residual component separation unit 411 based on the noise component $V_{2, init}$ supplied from the inverse wavelet transform unit 409. Steps S9 and S10 for the iteration control method are identical to those of the first embodiment. Therefore, descriptions thereof are omitted here.

The skeleton component/residual component separation unit 411 applies the T-V method to the initial denoised image $U_{2, init}$ that was supplied from the inverse wavelet transform unit 409 as an initial solution. Then, the skeleton component/residual component separation unit 411 separates the resulting image to a skeleton component $U_{2, T-V}$ and a residual component $V_{2, T-V}$ composed of a texture and a noise based on the iteration stop condition set by the iteration control unit 410. Steps S1, S2, S3, S4, and S5 for the separation method are identical to those of the first embodiment. Therefore, descriptions thereof are omitted here. Since there remains an unprocessed upper layer (step S22), the skeleton component/residual component separation unit 411 supplies thus obtained skeleton component $U_{2, T-V}$ that is considered as a $LL'_1$ component of the wavelet transform coefficient to an inverse wavelet transform unit 413.

After the completion of the processing at the second layer, processing continuously starts at the first layer (step S23).

The Shrinkage unit 412 applies the Shrinkage processing to the $LH_1$ component, the $HL_1$ component, and the $HH_1$ component of the wavelet transform coefficient that was supplied from the wavelet transform unit 401. Then, the Shrinkage unit 412 supplies a post-Shrinkage $LH'_1$ component, a post-Shrinkage $HL'_1$ component, and a post-Shrinkage $HH'_1$ component of the wavelet transform coefficient to the inverse wavelet transform unit 413.

The inverse wavelet transform unit 413 uses the $LH'_1$ component, the $HL'_1$ component, and the $HH'_1$ component of the wavelet transform coefficient that were supplied from the Shrinkage unit 412 and the $LL'_1$ component of the wavelet transform coefficient supplied from the skeleton component/residual component separation unit 411 to perform the inverse wavelet transform, thereby generating an initial denoised image $U_{1, init}$ having a resolution identical to the original image (step S21). Then, the inverse wavelet transform unit 413 supplies thus generated initial denoised image $U_{1, init}$ to a skeleton component/residual component separation unit 415. Also, the inverse wavelet transform unit 413 supplies the initial residual component $V_{1, init}$ that was separated from the input image F to an iteration control unit 414.

The iteration control unit 414 controls the iteration of the T-V method in the skeleton component/residual component separation unit 415 based on the initial residual component $V_{1, init}$ supplied from the inverse wavelet transform unit 413. Steps S9 and S10 for iteration control method are identical to those of the first embodiment. Therefore, descriptions thereof are omitted here.

The skeleton component/residual component separation unit 415 applies the T-V method to an initial denoised image $U_{1, init}$ having a resolution identical to the original image, the initial denoised image $U_{1, init}$ being supplied from the inverse wavelet transform unit 413 as an initial solution. Accordingly, the skeleton component/residual component separation unit 415 obtains a skeleton component $U_{1, T-V}$ and a texture component $V_{1, T-V}$.

After the completion of the processing at the first layer, the skeleton component/residual component separation unit 415 outputs thus obtained skeleton component $U_{1, T-V}$ as the output image Z (step S6).

The image processing method of the present invention generates a denoised image based on the above described operations.

Figure 18:
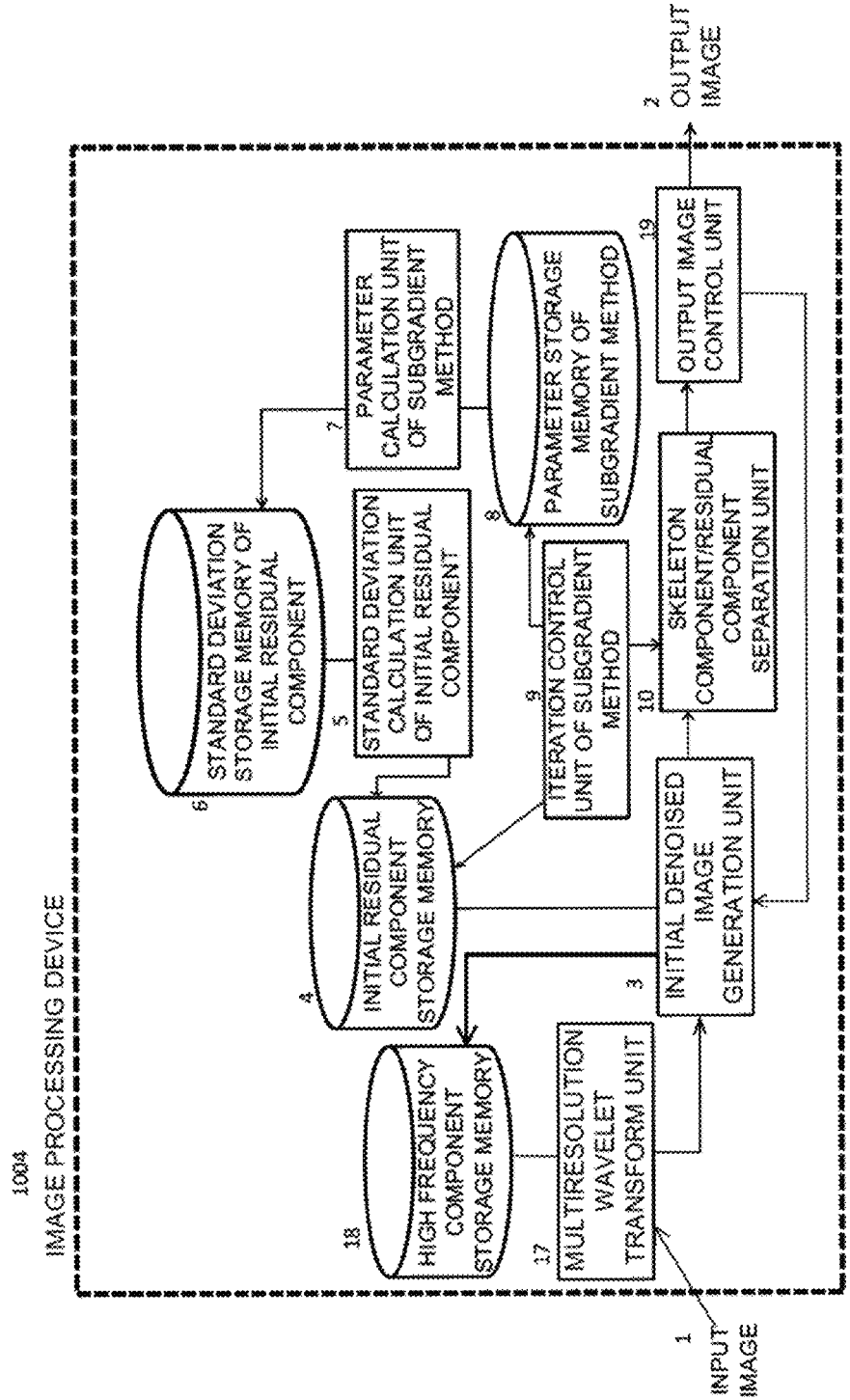
FIG. 18 is a block diagram illustrating an exemplary configuration of an image processing device according to the fourth embodiment.

Next, an image processing device that executes the image processing method according to the fourth embodiment will be described. FIG. 18 illustrates an exemplary configuration of the image processing device according to the fourth embodiment.

An image processing device 1004 applies the image processing to the input image 1 to output it as the output image 2.

The image processing device 1004 includes, similar to the image processing device 1000 of FIG. 7, the initial residual component storage memory 4, the standard deviation calculation unit 5 of the initial residual component, the standard deviation storage memory 6 of the initial residual component, the parameter calculation unit 7 of the subgradient method, the parameter storage memory 8 of the subgradient method, the iteration control unit 9 of the subgradient method, and the skeleton component/residual component separation unit 10. The processing of each of the above components is identical to each corresponding one of the image processing device 1000. Therefore, descriptions thereof are omitted here.

A multiresolution wavelet transform unit 17 applies the multiresolution wavelet transform to the input image 1 according to a procedure of step S19.

A high frequency component storage memory 18 stores a high frequency component of the wavelet transform coefficient that is supplied from the multiresolution wavelet transform unit 17.

The initial denoised image generation unit 3 generates an initial denoised image according to a procedure of step S21 based on a low frequency component of the wavelet transform coefficient of a layer to be processed and a high frequency component of the wavelet transform coefficient of a layer to be processed, the low frequency component being supplied from the multiresolution wavelet transform unit 17 or an output image control unit 19, and the high frequency component being obtained with reference to the high frequency component storage memory 18.

The output image control unit 19 outputs the skeleton component supplied from the skeleton component/residual component separation unit 10 as the output image 2 when a resolution of the layer to be processed matches the resolution of the input image 1. When the resolution of the layer to be processed is lower than the resolution of the input image 1, the output image control unit 19 considers the skeleton component supplied from the skeleton component/residual component separation unit 10 as a low frequency component of the wavelet transform coefficient of a layer having a resolution of a next higher layer and supplies it to the initial denoised image generation unit 3 according to procedures of steps S22 and S23.

Meanwhile, a configuration of the image processing device illustrated in FIG. 18 is a mere example. Any other configuration may be employed so far as the device realizes the equivalent function with the configuration.

According to the fourth embodiment, obtainment of the initial denoised image for each layer to use it as the initial solution of the T-V method of each layer ensures reduction of the iteration count of the Chambolle's projection method required until the solution is converged in the T-V method at each layer. This further ensures smooth removal of the high frequency noise as well as the low frequency noise.

Meanwhile, it is possible to easily configure an image processing method by combining the fourth embodiment and the second embodiment or an image processing method by combining the fourth embodiment and the third embodiment. Descriptions of the processing thereof are omitted here.

As apparent from the above description, it is possible to configure each unit with hardware. It is also possible to realize each function using a computer program. In this case, a processor operated by a program stored in the program memory realizes functions and operations equivalent to those of the above described embodiments. Alternatively, it is also possible to realize only a portion of the function of the above described embodiment with a computer program.

The above embodiments can be described partially or in whole according to the following supplementary notes. However, the present invention should not be limited to the following supplementary notes.

(Supplementary note 1) An image processing method including:

generating an initial denoised image with a reduced noise while preserving an edge in an input image;

controlling an iterative operation performed based on energy defined in advance based on an initial residual component calculated from the input image and the initial denoised image; and separating the initial denoised image to a skeleton component and a residual component by the controlled iterative operation to generate the skeleton component as an output image.

(Supplementary note 2) The image processing method according to supplementary note 1, further including:

extracting an edge component and a texture component from the residual component; and generating the output image by synthesizing the skeleton component, the edge component, and the texture component.

(Supplementary note 3) The image processing method according to supplementary note 1 further including:

extracting an edge component and a texture component from the initial residual component and the residual component; and generating the output image by synthesizing the skeleton component, the edge component, and the texture component.

(Supplementary note 4) The image processing method according to supplementary note 2 or supplementary note 3, wherein the edge component and the texture component are extracted based on a standard deviation of the initial residual component and a standard deviation of the residual component.

(Supplementary note 5) An image processing method including:

generating a plurality of images having different resolutions from an input image;

wherein, when an output image is generated by applying the image processing method according to any one of supplementary note 1 to supplementary note 4 for each different image, the output image generated based on an image having a low resolution is used for generation of an initial denoised image in an image having a next higher resolution.

(Supplementary note 6) An image processing device including:

an initial denoised image generation unit generating an initial denoised image by a noise removal method for storing an edge component in an input image;

a skeleton component/residual component separation unit separating the initial denoised image to a skeleton component and a residual component by an iterative operation based on energy defined in advance and generating the skeleton component as an output image; and a control unit controlling the iterative operation based on the initial residual component.

(Supplementary note 7) The image processing device according to supplementary note 6, wherein the skeleton component/residual component separation unit extracts an edge component and a texture component from the residual component, and synthesizes the skeleton component, the edge component, and the texture component to generate the output image.

(Supplementary note 8) The image processing device according to supplementary note 6, wherein the skeleton component/residual component separation unit extracts an edge component and a texture component from the initial residual component and the residual component, and synthesizes the skeleton component, the edge component, and the texture component to generate the output image.

(Supplementary note 9) The image processing device according to supplementary note 7 or supplementary note 8, wherein the skeleton component/residual component separation unit extracts the edge component and the texture component based on a standard deviation of the initial residual component and a standard deviation of the residual component.

(Supplementary note 10) The image processing device according to any one of supplementary note 6 to supplementary note 9, further including:

generation units generating a plurality of images having different resolutions from the input image;

wherein the initial denoised image generation unit, the skeleton component/residual component separation unit, and the control unit are provided correspondingly for each of the images having different resolutions; and wherein the initial denoised image generation unit uses the output image that was generated based on an image having a resolution next lower than the corresponding resolution for the generation of the initial denoised image.

(Supplementary note 11) A program causing a computer to execute generation processing for generating an initial denoised image with a reduced noise while preserving an edge in an input image;

control processing for controlling an iterative operation based on energy defined in advance based on an initial residual component calculated from the input image and the initial denoised image; and generation processing for separating the initial denoised image to a skeleton component and a residual component by the controlled iterative operation to generate the skeleton component as an output image.

(Supplementary note 12) The program according to supplementary note 11 causing the computer to execute extraction processing for extracting an edge component and a texture component from the residual component; and generation processing for synthesizing the skeleton component, the edge component, and the texture component to generate the output image.

(Supplementary note 13) The program according to supplementary note 11 causing the computer to execute extraction processing for extracting an edge component and a texture component from the initial residual component and the residual component; and generation processing for synthesizing the skeleton component, the edge component, and the texture component to generate the output image.

(Supplementary note 14) The program according to supplementary note 12 or supplementary note 13, wherein the edge component and the texture component are extracted based on a standard deviation of the initial residual component and a standard deviation of the residual component.

(Supplementary note 15) A program including:

generation processing for generating a plurality of images having different resolutions from an input image;

wherein, when an output image is generated by applying processing according to any one of supplementary note 11 to supplementary note 14 for each different image, an output image generated based on an image having a low resolution is used to generate an initial denoised image in an image having a next higher resolution.

The present invention has been described above with reference to the preferred embodiments and examples. The present invention, however, is not always limited to the above embodiments and examples, but may be modified to be carried out in various forms without departing from the technical concept of the present invention.

This application claims the benefit of Japanese Application No. 2012-102019, filed Apr. 27, 2012, the full disclosure of which is hereby incorporated by reference.

REFERENCE SIGNS LIST 1 input image
2 output image
3 initial denoised image generation unit
4 initial residual component storage memory
5 standard deviation calculation unit
6 standard deviation storage memory
7 parameter calculation unit
8 parameter storage memory
9 iteration control unit
10 skeleton component/residual component separation unit
11 noise suppression unit
12 synthesizing unit
13 noise suppression unit
14 restriction space creation unit
15 restriction storage memory
16 restriction processing unit
19 output image control unit
101 skeleton component/residual component separation unit
102 noise suppression unit
103 initial denoised image generation unit
104 iteration control unit
201 noise suppression unit
301 wavelet transform unit
302 Shrinkage unit
303 inverse wavelet transform
304 restriction space creation unit
305 wavelet transform unit
306 projection unit
307 inverse wavelet transform
401 wavelet transform unit
402 wavelet transform unit
403 wavelet transform unit
412 Shrinkage unit
404 Shrinkage unit
405 inverse wavelet transform
406 iteration control unit
407 skeleton component/residual component separation unit
408 Shrinkage unit
409 inverse wavelet transform
410 iteration control unit
411 skeleton component/residual component separation unit
413 inverse wavelet transform
414 iteration control unit
415 skeleton component/residual component separation unit
1000 image processing device

The invention claimed is:

1. An image processing method comprising:

generating an initial denoised image with a reduced noise while preserving an edge in an input image;

controlling an iterative operation performed based on energy defined in advance based on an initial residual component calculated from the input image and the initial denoised image;

separating the initial denoised image to a skeleton component and a residual component by the controlled iterative operation to generate the skeleton component as an output image;

extracting an edge component and a texture component from the residual component; and generating the output image by synthesizing the skeleton component, the edge component, and the texture component.

2. The image processing method according to claim 1 wherein the edge component and the texture component are extracted from the initial residual component and the residual component.

3. The image processing method according to claim 1, wherein the edge component and the texture component are extracted based on a standard deviation of the initial residual component and a standard deviation of the residual component.

4. The image processing method according to claim 1, further comprising:

generating a plurality of images having different resolutions from an input image;

wherein, when an output image is generated by applying the image processing method for each different image, the output image generated based on an image having a low resolution is used for generation of an initial denoised image in an image having a next higher resolution.

5. An image processing device comprising:

an initial denoised image generation unit generating an initial denoised image by a noise removal method for storing an edge component in an input image;

a skeleton component/residual component separation unit separating the initial denoised image to a skeleton component and a residual component by an iterative operation based on energy defined in advance and generating the skeleton component as an output image, the skeleton component/residual component separation unit extracting an edge component and a texture component from the residual component, and synthesizes the skeleton component, the edge component, and the texture component to generate the output image; and a control unit controlling the iterative operation based on the initial residual component.

6. The image processing device according to claim 5, wherein the skeleton component/residual component separation unit extracts the edge component and the texture component from the initial residual component and the residual component.

7. The image processing device according to claim 5, wherein the skeleton component/residual component separation unit extracts the edge component and the texture component based on a standard deviation of the initial residual component and a standard deviation of the residual component.

8. The image processing device according to claim 5, further comprising:

generation units generating a plurality of images having different resolutions from the input image, wherein the initial denoised image generation unit, the skeleton component/residual component separation unit, and the control unit are provided correspondingly for each of the images having different resolutions, and wherein the initial denoised image generation unit uses the output image that was generated based on an image having a resolution next lower than the corresponding resolution for the generation of the initial denoised image.

9. The image processing method according to claim 2, wherein the edge component and the texture component are extracted based on a standard deviation of the initial residual component and a standard deviation of the residual component.

10. The image processing device according to claim 6, wherein the skeleton component/residual component separation unit extracts the edge component and the texture component based on a standard deviation of the initial residual component and a standard deviation of the residual component.

11. A non-transitory computer readable storage medium storing a program causing a computer to execute:

generation processing for generating an initial denoised image with a reduced noise while preserving an edge in an input image;

control processing for controlling an iterative operation based on energy defined in advance based on an initial residual component calculated from the input image and the initial denoised image;

generation processing for separating the initial denoised image to a skeleton component and a residual component by the controlled iterative operation to generate the skeleton component as an output image;

extraction processing for extracting an edge component and a texture component from the residual component; and generation processing for synthesizing the skeleton component, the edge component, and the texture component to generate the output image.

12. The non-transitory computer readable storage medium storing the program according to claim 11, wherein the edge component and the texture component are extracted from the initial residual component and the residual component.

13. The non-transitory computer readable storage medium storing the program according to claim 11, wherein the edge component and the texture component are extracted based on a standard deviation of the initial residual component and a standard deviation of the residual component.

14. The non-transitory computer readable storage medium storing the program according to claim 12, wherein the edge component and the texture component are extracted based on a standard deviation of the initial residual component and a standard deviation of the residual component.

15. The non-transitory computer readable storage medium storing the program according to claim 11 causing the computer to execute:

generation processing for generating a plurality of images having different resolutions from an input image, wherein, when an output image is generated by applying processing for each different image, an output image generated based on an image having a low resolution is used to generate an initial denoised image in an image having a next higher resolution.

* * * * *